United States Patent
Wilson

(10) Patent No.: US 10,776,464 B2
(45) Date of Patent: Sep. 15, 2020

(54) SYSTEM AND METHOD FOR ADAPTIVE APPLICATION OF AUTHENTICATION POLICIES

(71) Applicant: NOK NOK LABS, INC., Palo Alto, CA (US)

(72) Inventor: Brendon Wilson, San Jose, CA (US)

(73) Assignee: Nok Nok Labs, Inc., San Jose, CA (US)

( * ) Notice: Subject to any disclaimer, the term of this patent is extended or adjusted under 35 U.S.C. 154(b) by 232 days.

(21) Appl. No.: 14/218,646

(22) Filed: Mar. 18, 2014

(65) Prior Publication Data

US 2014/0289790 A1   Sep. 25, 2014

Related U.S. Application Data

(60) Provisional application No. 61/804,568, filed on Mar. 22, 2013.

(51) Int. Cl.
*G06F 21/00* (2013.01)
*G06F 21/32* (2013.01)
(Continued)

(52) U.S. Cl.
CPC ............ *G06F 21/32* (2013.01); *G06F 21/577* (2013.01); *G06Q 20/204* (2013.01);
(Continued)

(58) Field of Classification Search
CPC .......... G06F 21/31; G06F 21/32; G06F 21/44; G06F 21/445; G06F 2221/2115; G06F 21/577; G07F 19/20; G06Q 20/42; G06Q 20/40145; G06Q 20/425; G06Q 20/4012; G06Q 20/3278; G06Q 20/3274;
(Continued)

(56) References Cited

U.S. PATENT DOCUMENTS 5,272,754 A   12/1993  Boerbert et al.
5,280,527 A    1/1994  Gullman et al.
(Continued)

FOREIGN PATENT DOCUMENTS

CN      1705925 A   12/2005
CN    101394283 A    3/2009
(Continued)

OTHER PUBLICATIONS

Requirement for Restriction/Election from U.S. Appl. No. 14/218,504 dated Aug. 16, 2016, 11 pages.
(Continued)

*Primary Examiner* — John B King
(74) *Attorney, Agent, or Firm* — Nicholson De Vos Webster & Elliott LLP

(57) ABSTRACT

A system, apparatus, method, and machine readable medium are described for adaptively implementing an authentication policy. For example, one embodiment of a method comprises: detecting a user of a client attempting to perform a current interaction with a relying party; and responsively identifying a first interaction class for the current interaction based on variables associated with the current interaction and implementing a set of one or more authentication rules associated with the first interaction class.

28 Claims, 11 Drawing Sheets

(51) Int. Cl.

| | | |
|---|---|---|
| *G06Q 20/40* | (2012.01) | |
| *G07F 19/00* | (2006.01) | |
| *G06Q 20/20* | (2012.01) | |
| *G06Q 20/32* | (2012.01) | |
| *G06Q 20/42* | (2012.01) | |
| *H04L 29/06* | (2006.01) | |
| *H04L 9/32* | (2006.01) | |
| *H04L 9/08* | (2006.01) | |
| *G06F 21/57* | (2013.01) | |
| *H04W 12/06* | (2009.01) | |

(52) U.S. Cl.
CPC ..... *G06Q 20/3224* (2013.01); *G06Q 20/3274* (2013.01); *G06Q 20/3278* (2013.01); *G06Q 20/4012* (2013.01); *G06Q 20/40145* (2013.01); *G06Q 20/42* (2013.01); *G06Q 20/425* (2013.01); *G07F 19/20* (2013.01); *H04L 9/0819* (2013.01); *H04L 9/0822* (2013.01); *H04L 9/0841* (2013.01); *H04L 9/3231* (2013.01); *H04L 9/3247* (2013.01); *H04L 9/3297* (2013.01); *H04L 63/0492* (2013.01); *H04L 63/08* (2013.01); *H04L 63/083* (2013.01); *H04L 63/0861* (2013.01); *H04L 63/20* (2013.01); *G06F 2221/2115* (2013.01); *H04L 2209/805* (2013.01); *H04L 2463/102* (2013.01); *H04W 12/06* (2013.01)

(58) Field of Classification Search
CPC .............. G06Q 20/3224; G06Q 20/204; H04L 2209/805; H04L 2463/102; H04L 9/3231; H04L 63/0492; H04L 63/0861; H04L 63/083; H04L 63/20; H04L 9/0841; H04L 9/0822; H04L 9/0819; H04L 63/08; H04L 9/3297; H04L 9/3247; H04W 12/06
See application file for complete search history.

(56) References Cited

U.S. PATENT DOCUMENTS

| | | | |
|---|---|---|---|
| 5,764,789 A | 6/1998 | Pare, Jr. et al. | |
| 5,892,900 A | 4/1999 | Ginter et al. | |
| 6,035,406 A | 3/2000 | Moussa et al. | |
| 6,088,450 A | 7/2000 | Davis et al. | |
| 6,178,511 B1 | 1/2001 | Cohen et al. | |
| 6,270,011 B1 | 8/2001 | Gottfried | |
| 6,377,691 B1 | 4/2002 | Swift et al. | |
| 6,510,236 B1 | 1/2003 | Crane et al. | |
| 6,588,812 B1 | 7/2003 | Garcia et al. | |
| 6,618,806 B1 | 9/2003 | Brown et al. | |
| 6,751,733 B1 | 6/2004 | Nakamura et al. | |
| 6,801,998 B1 | 10/2004 | Hanna et al. | |
| 6,842,896 B1 * | 1/2005 | Redding | G06Q 10/10 713/155 |
| 6,938,156 B2 | 8/2005 | Wheeler et al. | |
| 7,155,035 B2 | 12/2006 | Kondo et al. | |
| 7,194,761 B1 | 3/2007 | Champagne | |
| 7,194,763 B2 | 3/2007 | Potter et al. | |
| 7,263,717 B1 | 8/2007 | Boydstun et al. | |
| 7,444,368 B1 | 10/2008 | Wong et al. | |
| 7,487,357 B2 | 2/2009 | Smith et al. | |
| 7,512,567 B2 | 3/2009 | Bemmel et al. | |
| 7,698,565 B1 | 4/2010 | Bjorn et al. | |
| 7,865,937 B1 | 1/2011 | White et al. | |
| 7,941,669 B2 | 5/2011 | Foley et al. | |
| 8,060,922 B2 | 11/2011 | Crichton et al. | |
| 8,166,531 B2 | 4/2012 | Suzuki | |
| 8,185,457 B1 | 5/2012 | Bear et al. | |
| 8,245,030 B2 | 8/2012 | Lin | |
| 8,284,043 B2 | 10/2012 | Judd et al. | |
| 8,291,468 B1 | 10/2012 | Chickering | |
| 8,353,016 B1 | 1/2013 | Pravetz et al. | |
| 8,359,045 B1 | 1/2013 | Hopkins, III | |
| 8,412,928 B1 | 4/2013 | Bowness | |
| 8,458,465 B1 | 6/2013 | Stern et al. | |
| 8,489,506 B2 | 7/2013 | Hammad et al. | |
| 8,516,552 B2 | 8/2013 | Raleigh | |
| 8,526,607 B2 | 9/2013 | Liu et al. | |
| 8,555,340 B2 | 10/2013 | Potter et al. | |
| 8,561,152 B2 | 10/2013 | Novak et al. | |
| 8,584,219 B1 | 11/2013 | Toole et al. | |
| 8,584,224 B1 | 11/2013 | Pei et al. | |
| 8,607,048 B2 | 12/2013 | Nogawa | |
| 8,646,060 B1 | 2/2014 | Ben | |
| 8,713,325 B2 | 4/2014 | Ganesan | |
| 8,719,905 B2 | 5/2014 | Ganesan | |
| 8,745,698 B1 | 6/2014 | Ashfield et al. | |
| 8,776,180 B2 | 7/2014 | Kumar et al. | |
| 8,843,997 B1 | 9/2014 | Hare | |
| 8,856,541 B1 | 10/2014 | Chaudhury | |
| 8,949,978 B1 | 2/2015 | Lin et al. | |
| 8,958,599 B1 | 2/2015 | Starner | |
| 8,978,117 B2 | 3/2015 | Bentley et al. | |
| 9,015,482 B2 | 4/2015 | Baghdasaryan et al. | |
| 9,032,485 B2 | 5/2015 | Chu et al. | |
| 9,083,689 B2 | 7/2015 | Lindemann et al. | |
| 9,161,209 B2 | 10/2015 | Ghoshal et al. | |
| 9,171,306 B1 | 10/2015 | He et al. | |
| 9,172,687 B2 | 10/2015 | Baghdasaryan et al. | |
| 9,219,732 B2 | 12/2015 | Baghdasaryan et al. | |
| 9,306,754 B2 | 4/2016 | Baghdasaryan et al. | |
| 9,317,705 B2 | 4/2016 | O'Hare et al. | |
| 9,367,678 B2 | 6/2016 | Pal et al. | |
| 9,396,320 B2 | 7/2016 | Lindemann | |
| 9,521,548 B2 | 12/2016 | Fosmark et al. | |
| 9,547,760 B2 | 1/2017 | Kang et al. | |
| 9,633,322 B1 | 4/2017 | Burger | |
| 9,698,976 B1 | 7/2017 | Statica et al. | |
| 2001/0037451 A1 | 11/2001 | Bhagavatula et al. | |
| 2002/0010857 A1 | 1/2002 | Karthik | |
| 2002/0016913 A1 | 2/2002 | Wheeler et al. | |
| 2002/0037736 A1 | 3/2002 | Kawaguchi et al. | |
| 2002/0040344 A1 | 4/2002 | Preiser et al. | |
| 2002/0054695 A1 | 5/2002 | Bjorn et al. | |
| 2002/0073316 A1 | 6/2002 | Collins et al. | |
| 2002/0073320 A1 | 6/2002 | Rinkevich et al. | |
| 2002/0082962 A1 | 6/2002 | Farris et al. | |
| 2002/0087894 A1 | 7/2002 | Foley et al. | |
| 2002/0112157 A1 | 8/2002 | Doyle et al. | |
| 2002/0112170 A1 | 8/2002 | Foley et al. | |
| 2002/0174344 A1 * | 11/2002 | Ting | G06F 21/32 713/185 |
| 2002/0174348 A1 | 11/2002 | Ting | |
| 2002/0190124 A1 | 12/2002 | Piotrowski | |
| 2003/0021283 A1 * | 1/2003 | See | H04L 41/0213 370/401 |
| 2003/0055792 A1 | 3/2003 | Kinoshita et al. | |
| 2003/0065805 A1 | 4/2003 | Barnes et al. | |
| 2003/0084300 A1 | 5/2003 | Koike | |
| 2003/0087629 A1 | 5/2003 | Juitt et al. | |
| 2003/0115142 A1 | 6/2003 | Brickell et al. | |
| 2003/0135740 A1 | 7/2003 | Talmor et al. | |
| 2003/0152252 A1 | 8/2003 | Kondo et al. | |
| 2003/0226036 A1 | 12/2003 | Bivens et al. | |
| 2003/0236991 A1 | 12/2003 | Letsinger | |
| 2004/0039909 A1 * | 2/2004 | Cheng | G06F 21/32 713/169 |
| 2004/0101170 A1 | 5/2004 | Tisse et al. | |
| 2004/0123153 A1 | 6/2004 | Wright et al. | |
| 2005/0021964 A1 | 1/2005 | Bhatnagar et al. | |
| 2005/0080716 A1 | 4/2005 | Belyi et al. | |
| 2005/0097320 A1 | 5/2005 | Golan et al. | |
| 2005/0100166 A1 * | 5/2005 | Smetters | H04L 63/0492 380/277 |
| 2005/0125295 A1 | 6/2005 | Tidwell et al. | |
| 2005/0160052 A1 | 7/2005 | Schneider et al. | |
| 2005/0187883 A1 | 8/2005 | Bishop et al. | |
| 2005/0223217 A1 | 10/2005 | Howard et al. | |
| 2005/0223236 A1 | 10/2005 | Yamada et al. | |
| 2005/0278253 A1 | 12/2005 | Meek et al. | |
| 2006/0026671 A1 | 2/2006 | Potter et al. | |

(56) References Cited

U.S. PATENT DOCUMENTS

| | | |
|---|---|---|
| 2006/0029062 A1 | 2/2006 | Rao et al. |
| 2006/0064582 A1 | 3/2006 | Teal et al. |
| 2006/0101136 A1 | 5/2006 | Akashika et al. |
| 2006/0149580 A1 | 7/2006 | Helsper et al. |
| 2006/0156385 A1 | 7/2006 | Chiviendacz et al. |
| 2006/0161435 A1 | 7/2006 | Atef et al. |
| 2006/0161672 A1 | 7/2006 | Jolley et al. |
| 2006/0174037 A1 | 8/2006 | Bernardi et al. |
| 2006/0177061 A1 | 8/2006 | Orsini et al. |
| 2006/0195689 A1 | 8/2006 | Blecken et al. |
| 2006/0213978 A1 | 9/2006 | Geller et al. |
| 2006/0282670 A1 | 12/2006 | Karchov |
| 2007/0005988 A1 | 1/2007 | Zhang et al. |
| 2007/0038568 A1 | 2/2007 | Greene et al. |
| 2007/0077915 A1 | 4/2007 | Black et al. |
| 2007/0087756 A1 | 4/2007 | Hoffberg |
| 2007/0088950 A1 | 4/2007 | Wheeler et al. |
| 2007/0094165 A1 | 4/2007 | Gyorfi et al. |
| 2007/0100756 A1 | 5/2007 | Varma |
| 2007/0101138 A1 | 5/2007 | Camenisch et al. |
| 2007/0106895 A1 | 5/2007 | Huang et al. |
| 2007/0107048 A1 | 5/2007 | Halls et al. |
| 2007/0118883 A1 | 5/2007 | Potter et al. |
| 2007/0165625 A1 | 7/2007 | Eisner et al. |
| 2007/0168677 A1 | 7/2007 | Kudo et al. |
| 2007/0169182 A1 | 7/2007 | Wolfond et al. |
| 2007/0198435 A1 | 8/2007 | Siegal et al. |
| 2007/0217590 A1 | 9/2007 | Loupia et al. |
| 2007/0234417 A1 | 10/2007 | Blakley, III et al. |
| 2007/0239980 A1 | 10/2007 | Funayama |
| 2007/0278291 A1 | 12/2007 | Rans et al. |
| 2007/0286130 A1 | 12/2007 | Shao et al. |
| 2007/0288380 A1 | 12/2007 | Starrs |
| 2008/0005562 A1 | 1/2008 | Sather et al. |
| 2008/0024302 A1 | 1/2008 | Yoshida |
| 2008/0025234 A1* | 1/2008 | Zhu .................. H04L 12/66 370/256 |
| 2008/0028453 A1 | 1/2008 | Nguyen et al. |
| 2008/0034207 A1 | 2/2008 | Cam-Winget et al. |
| 2008/0046334 A1 | 2/2008 | Lee et al. |
| 2008/0046984 A1 | 2/2008 | Bohmer et al. |
| 2008/0049983 A1 | 2/2008 | Miller et al. |
| 2008/0072054 A1 | 3/2008 | Choi |
| 2008/0086759 A1 | 4/2008 | Colson |
| 2008/0134311 A1 | 6/2008 | Medvinsky et al. |
| 2008/0141339 A1 | 6/2008 | Gomez et al. |
| 2008/0172725 A1 | 7/2008 | Fujii et al. |
| 2008/0184351 A1 | 7/2008 | Gephart et al. |
| 2008/0189212 A1 | 8/2008 | Kulakowski et al. |
| 2008/0209545 A1 | 8/2008 | Asano |
| 2008/0232565 A1 | 9/2008 | Kutt et al. |
| 2008/0235801 A1 | 9/2008 | Soderberg et al. |
| 2008/0271150 A1 | 10/2008 | Boerger et al. |
| 2008/0289019 A1 | 11/2008 | Lam |
| 2008/0289020 A1 | 11/2008 | Cameron et al. |
| 2008/0313719 A1 | 12/2008 | Kaliski, Jr. et al. |
| 2008/0320308 A1 | 12/2008 | Kostiainen et al. |
| 2009/0025084 A1 | 1/2009 | Siourthas et al. |
| 2009/0049510 A1 | 2/2009 | Zhang et al. |
| 2009/0055322 A1 | 2/2009 | Bykov et al. |
| 2009/0064292 A1 | 3/2009 | Carter et al. |
| 2009/0083850 A1 | 3/2009 | Fadell et al. |
| 2009/0089870 A1 | 4/2009 | Wahl |
| 2009/0100269 A1 | 4/2009 | Naccache |
| 2009/0116651 A1 | 5/2009 | Liang et al. |
| 2009/0119221 A1 | 5/2009 | Weston et al. |
| 2009/0133113 A1 | 5/2009 | Schneider |
| 2009/0138724 A1 | 5/2009 | Chiou et al. |
| 2009/0138727 A1 | 5/2009 | Campello de Souza |
| 2009/0158425 A1 | 6/2009 | Chan et al. |
| 2009/0164797 A1 | 6/2009 | Kramer et al. |
| 2009/0183003 A1 | 7/2009 | Haverinen |
| 2009/0187988 A1 | 7/2009 | Hulten et al. |
| 2009/0193508 A1 | 7/2009 | Brenneman et al. |
| 2009/0196418 A1 | 8/2009 | Tkacik et al. |
| 2009/0199264 A1 | 8/2009 | Lang |
| 2009/0204964 A1 | 8/2009 | Foley et al. |
| 2009/0235339 A1 | 9/2009 | Mennes et al. |
| 2009/0240624 A1 | 9/2009 | James et al. |
| 2009/0245507 A1 | 10/2009 | Vuillaume et al. |
| 2009/0271618 A1 | 10/2009 | Camenisch et al. |
| 2009/0271635 A1 | 10/2009 | Liu et al. |
| 2009/0300714 A1 | 12/2009 | Ahn |
| 2009/0300720 A1 | 12/2009 | Guo et al. |
| 2009/0307139 A1 | 12/2009 | Mardikar et al. |
| 2009/0327131 A1 | 12/2009 | Beenau et al. |
| 2009/0328197 A1 | 12/2009 | Newell et al. |
| 2010/0010932 A1 | 1/2010 | Law et al. |
| 2010/0023454 A1 | 1/2010 | Exton et al. |
| 2010/0029300 A1 | 2/2010 | Chen |
| 2010/0042848 A1 | 2/2010 | Rosener |
| 2010/0242102 A1 | 2/2010 | Cross et al. |
| 2010/0062744 A1 | 3/2010 | Ibrahim |
| 2010/0070424 A1 | 3/2010 | Monk |
| 2010/0082484 A1 | 4/2010 | Erhart et al. |
| 2010/0083000 A1 | 4/2010 | Kesanupalli |
| 2010/0094681 A1 | 4/2010 | Almen et al. |
| 2010/0105427 A1 | 4/2010 | Gupta |
| 2010/0107222 A1 | 4/2010 | Glasser |
| 2010/0114776 A1 | 5/2010 | Weller et al. |
| 2010/0121855 A1 | 5/2010 | Dalia et al. |
| 2010/0169650 A1 | 7/2010 | Brickell et al. |
| 2010/0175116 A1 | 7/2010 | Gum |
| 2010/0186072 A1 | 7/2010 | Kumar |
| 2010/0191612 A1 | 7/2010 | Raleigh |
| 2010/0192209 A1 | 7/2010 | Steeves et al. |
| 2010/0205658 A1 | 8/2010 | Griffin |
| 2010/0211792 A1 | 8/2010 | Ureche et al. |
| 2010/0223663 A1 | 9/2010 | Morimoto et al. |
| 2010/0242088 A1 | 9/2010 | Thomas |
| 2010/0266128 A1 | 10/2010 | Asokan et al. |
| 2010/0274677 A1 | 10/2010 | Florek et al. |
| 2010/0287369 A1 | 11/2010 | Monden |
| 2010/0299265 A1 | 11/2010 | Walters et al. |
| 2010/0299738 A1 | 11/2010 | Wahl |
| 2010/0325427 A1 | 12/2010 | Ekberg et al. |
| 2010/0325664 A1 | 12/2010 | Kang |
| 2010/0325684 A1 | 12/2010 | Grebenik et al. |
| 2010/0325711 A1 | 12/2010 | Etchegoyen |
| 2011/0004918 A1 | 1/2011 | Chow et al. |
| 2011/0004933 A1 | 1/2011 | Dickinson et al. |
| 2011/0022835 A1 | 1/2011 | Schibuk |
| 2011/0047608 A1 | 2/2011 | Levenberg |
| 2011/0071841 A1 | 3/2011 | Fomenko et al. |
| 2011/0078443 A1 | 3/2011 | Greenstein et al. |
| 2011/0082801 A1 | 4/2011 | Baghdasaryan et al. |
| 2011/0083016 A1 | 4/2011 | Kesanupalli et al. |
| 2011/0093942 A1 | 4/2011 | Koster et al. |
| 2011/0099361 A1 | 4/2011 | Shah et al. |
| 2011/0107087 A1 | 5/2011 | Lee et al. |
| 2011/0138450 A1 | 6/2011 | Kesanupalli et al. |
| 2011/0157346 A1 | 6/2011 | Zyzdryn et al. |
| 2011/0167154 A1 | 7/2011 | Bush et al. |
| 2011/0167472 A1 | 7/2011 | Evans et al. |
| 2011/0184838 A1 | 7/2011 | Winters et al. |
| 2011/0191200 A1 | 8/2011 | Bayer et al. |
| 2011/0197267 A1 | 8/2011 | Gravel et al. |
| 2011/0219427 A1 | 9/2011 | Hito et al. |
| 2011/0225431 A1 | 9/2011 | Stufflebeam, Jr. et al. |
| 2011/0225643 A1 | 9/2011 | Faynberg et al. |
| 2011/0228330 A1 | 9/2011 | Nogawa |
| 2011/0231911 A1 | 9/2011 | White et al. |
| 2011/0246766 A1 | 10/2011 | Orsini et al. |
| 2011/0265159 A1 | 10/2011 | Ronda et al. |
| 2011/0279228 A1 | 11/2011 | Kumar et al. |
| 2011/0280402 A1 | 11/2011 | Ibrahim et al. |
| 2011/0296518 A1 | 12/2011 | Faynberg et al. |
| 2011/0307706 A1 | 12/2011 | Fielder |
| 2011/0307949 A1 | 12/2011 | Ronda et al. |
| 2011/0313872 A1 | 12/2011 | Carter et al. |
| 2011/0314549 A1 | 12/2011 | Song et al. |
| 2011/0320823 A1 | 12/2011 | Saroiu et al. |
| 2012/0018506 A1 | 1/2012 | Hammad et al. |
| 2012/0023567 A1 | 1/2012 | Hammad |

(56) References Cited

U.S. PATENT DOCUMENTS

| | | |
|---|---|---|
| 2012/0023568 A1 | 1/2012 | Cha et al. |
| 2012/0030083 A1 | 2/2012 | Newman et al. |
| 2012/0046012 A1 | 2/2012 | Forutanpour et al. |
| 2012/0047555 A1 | 2/2012 | Xiao et al. |
| 2012/0066757 A1 | 3/2012 | Vysogorets et al. |
| 2012/0075062 A1 | 3/2012 | Osman et al. |
| 2012/0084566 A1 | 4/2012 | Chin et al. |
| 2012/0102553 A1 | 4/2012 | Hsueh et al. |
| 2012/0124639 A1 | 5/2012 | Shaikh et al. |
| 2012/0124651 A1 | 5/2012 | Ganesan et al. |
| 2012/0130898 A1 | 5/2012 | Snyder et al. |
| 2012/0137137 A1 | 5/2012 | Brickell et al. |
| 2012/0144461 A1 | 6/2012 | Rathbun |
| 2012/0159577 A1 | 6/2012 | Belinkiy et al. |
| 2012/0191979 A1 | 7/2012 | Feldbau |
| 2012/0203906 A1* | 8/2012 | Jaudon ............... H04W 76/04 709/225 |
| 2012/0204032 A1 | 8/2012 | Wilkins et al. |
| 2012/0210135 A1 | 8/2012 | Panchapakesan et al. |
| 2012/0239950 A1 | 9/2012 | Davis et al. |
| 2012/0249298 A1 | 10/2012 | Sovio et al. |
| 2012/0272056 A1 | 10/2012 | Ganesan |
| 2012/0278873 A1 | 11/2012 | Calero et al. |
| 2012/0291114 A1 | 11/2012 | Poliashenko et al. |
| 2012/0313746 A1 | 12/2012 | Rahman et al. |
| 2012/0317297 A1 | 12/2012 | Bailey |
| 2012/0323717 A1 | 12/2012 | Kirsch |
| 2013/0013931 A1 | 1/2013 | O'Hare et al. |
| 2013/0042115 A1 | 2/2013 | Sweet et al. |
| 2013/0042327 A1 | 2/2013 | Chow |
| 2013/0046976 A1 | 2/2013 | Rosati et al. |
| 2013/0046991 A1 | 2/2013 | Lu et al. |
| 2013/0047200 A1 | 2/2013 | Radhakrishnan et al. |
| 2013/0054336 A1 | 2/2013 | Graylin |
| 2013/0054967 A1 | 2/2013 | Davoust et al. |
| 2013/0055370 A1 | 2/2013 | Goldberg et al. |
| 2013/0061055 A1 | 3/2013 | Schibuk |
| 2013/0067546 A1 | 3/2013 | Thavasi et al. |
| 2013/0073859 A1 | 3/2013 | Carlson et al. |
| 2013/0086669 A1 | 4/2013 | Sondhi et al. |
| 2013/0090939 A1* | 4/2013 | Robinson ............... G06F 21/32 705/2 |
| 2013/0097682 A1 | 4/2013 | Zeljkovic et al. |
| 2013/0104187 A1 | 4/2013 | Weidner |
| 2013/0104190 A1* | 4/2013 | Simske ................. G06F 21/60 726/1 |
| 2013/0119130 A1 | 5/2013 | Braams |
| 2013/0124285 A1 | 5/2013 | Pravetz et al. |
| 2013/0124422 A1 | 5/2013 | Hubert et al. |
| 2013/0125197 A1 | 5/2013 | Pravetz et al. |
| 2013/0125222 A1 | 5/2013 | Pravetz et al. |
| 2013/0133049 A1 | 5/2013 | Peirce |
| 2013/0133054 A1 | 5/2013 | Davis et al. |
| 2013/0144785 A1 | 6/2013 | Karpenko et al. |
| 2013/0159413 A1 | 6/2013 | Davis et al. |
| 2013/0159716 A1 | 6/2013 | Buck et al. |
| 2013/0160083 A1 | 6/2013 | Schrix et al. |
| 2013/0160100 A1 | 6/2013 | Langley |
| 2013/0167196 A1 | 6/2013 | Spencer et al. |
| 2013/0191884 A1 | 7/2013 | Leicher et al. |
| 2013/0212637 A1 | 8/2013 | Guccione et al. |
| 2013/0219456 A1 | 8/2013 | Sharma et al. |
| 2013/0227646 A1 | 8/2013 | Haggerty et al. |
| 2013/0239173 A1 | 9/2013 | Dispensa |
| 2013/0246272 A1* | 9/2013 | Kirsch ............... G06Q 20/3821 705/44 |
| 2013/0262305 A1 | 10/2013 | Jones et al. |
| 2013/0276060 A1 | 10/2013 | Wiedmann et al. |
| 2013/0282589 A1 | 10/2013 | Shoup et al. |
| 2013/0308778 A1 | 11/2013 | Fosmark et al. |
| 2013/0318343 A1 | 11/2013 | Bjarnason et al. |
| 2013/0326215 A1 | 12/2013 | Leggette et al. |
| 2013/0337777 A1 | 12/2013 | Deutsch et al. |
| 2013/0346176 A1 | 12/2013 | Alolabi et al. |
| 2013/0347064 A1 | 12/2013 | Aissi et al. |
| 2014/0002238 A1 | 1/2014 | Taveau et al. |
| 2014/0006776 A1 | 1/2014 | Scott-Nash et al. |
| 2014/0007215 A1 | 1/2014 | Romano et al. |
| 2014/0013422 A1 | 1/2014 | Janus et al. |
| 2014/0033271 A1 | 1/2014 | Barton et al. |
| 2014/0037092 A1 | 2/2014 | Bhattacharya et al. |
| 2014/0040987 A1 | 2/2014 | Haugsnes |
| 2014/0044265 A1 | 2/2014 | Kocher et al. |
| 2014/0047510 A1 | 2/2014 | Belton et al. |
| 2014/0066015 A1 | 3/2014 | Aissi |
| 2014/0068746 A1 | 3/2014 | Gonzalez et al. |
| 2014/0075516 A1 | 3/2014 | Chermside |
| 2014/0089243 A1 | 3/2014 | Oppenheimer |
| 2014/0090039 A1 | 3/2014 | Bhow |
| 2014/0090088 A1 | 3/2014 | Bjones et al. |
| 2014/0096182 A1 | 4/2014 | Smith |
| 2014/0101439 A1 | 4/2014 | Pettigrew et al. |
| 2014/0109174 A1 | 4/2014 | Barton et al. |
| 2014/0114857 A1 | 4/2014 | Griggs et al. |
| 2014/0115702 A1 | 4/2014 | Li et al. |
| 2014/0130127 A1 | 5/2014 | Toole et al. |
| 2014/0137191 A1 | 5/2014 | Goldsmith |
| 2014/0164776 A1 | 6/2014 | Hook et al. |
| 2014/0173754 A1 | 6/2014 | Barbir |
| 2014/0188770 A1 | 7/2014 | Agrafioti et al. |
| 2014/0189350 A1* | 7/2014 | Baghdasaryan ...... H04L 9/3271 713/168 |
| 2014/0189360 A1* | 7/2014 | Baghdasaryan ...... H04L 9/3247 713/176 |
| 2014/0189779 A1* | 7/2014 | Baghdasaryan ........ H04L 63/08 726/1 |
| 2014/0189791 A1* | 7/2014 | Lindemann ........... H04L 63/105 726/3 |
| 2014/0189807 A1 | 7/2014 | Cahill et al. |
| 2014/0189808 A1 | 7/2014 | Mahaffey et al. |
| 2014/0189828 A1* | 7/2014 | Baghdasaryan .... H04L 63/0861 726/6 |
| 2014/0189835 A1 | 7/2014 | Umerley |
| 2014/0201809 A1 | 7/2014 | Choyi et al. |
| 2014/0230032 A1 | 8/2014 | Duncan |
| 2014/0245391 A1 | 8/2014 | Adenuga |
| 2014/0250011 A1 | 9/2014 | Weber |
| 2014/0250523 A1 | 9/2014 | Savvides et al. |
| 2014/0258125 A1 | 9/2014 | Gerber et al. |
| 2014/0258711 A1 | 9/2014 | Brannon |
| 2014/0279516 A1 | 9/2014 | Rellas et al. |
| 2014/0282868 A1 | 9/2014 | Sheller et al. |
| 2014/0282945 A1 | 9/2014 | Smith et al. |
| 2014/0282965 A1 | 9/2014 | Sambamurthy et al. |
| 2014/0289116 A1 | 9/2014 | Polivanyi et al. |
| 2014/0289117 A1 | 9/2014 | Baghdasaryan |
| 2014/0289820 A1 | 9/2014 | Lindemann et al. |
| 2014/0289821 A1 | 9/2014 | Wilson |
| 2014/0289833 A1 | 9/2014 | Briceno et al. |
| 2014/0289834 A1 | 9/2014 | Lindemann |
| 2014/0298419 A1 | 10/2014 | Boubez et al. |
| 2014/0304505 A1 | 10/2014 | Dawson |
| 2014/0325239 A1 | 10/2014 | Ghose |
| 2014/0333413 A1 | 11/2014 | Kursun et al. |
| 2014/0335824 A1 | 11/2014 | Abraham |
| 2014/0337948 A1 | 11/2014 | Hoyos |
| 2015/0019220 A1 | 1/2015 | Talhami et al. |
| 2015/0046340 A1 | 2/2015 | Dimmick |
| 2015/0058931 A1 | 2/2015 | Miu et al. |
| 2015/0095999 A1 | 4/2015 | Toth et al. |
| 2015/0096002 A1 | 4/2015 | Shuart et al. |
| 2015/0121068 A1 | 4/2015 | Lindemann et al. |
| 2015/0134330 A1 | 5/2015 | Baldwin et al. |
| 2015/0142628 A1 | 5/2015 | Suplee et al. |
| 2015/0180869 A1 | 6/2015 | Verma |
| 2015/0193781 A1 | 7/2015 | Dave et al. |
| 2015/0242605 A1 | 8/2015 | Du et al. |
| 2015/0244525 A1 | 8/2015 | McCusker et al. |
| 2015/0244696 A1 | 8/2015 | Ma |
| 2015/0269050 A1 | 9/2015 | Filimonov et al. |
| 2015/0326529 A1 | 11/2015 | Morita |
| 2015/0373039 A1 | 12/2015 | Wang |
| 2015/0381580 A1 | 12/2015 | Graham, III et al. |
| 2016/0034892 A1 | 2/2016 | Carpenter et al. |

(56) References Cited

U.S. PATENT DOCUMENTS

| | | |
|---|---|---|
| 2016/0036588 A1 | 2/2016 | Thackston |
| 2016/0071105 A1 | 3/2016 | Groarke et al. |
| 2016/0072787 A1 | 3/2016 | Balabine et al. |
| 2016/0078869 A1 | 3/2016 | Syrdal et al. |
| 2016/0087952 A1 | 3/2016 | Tartz et al. |
| 2016/0087957 A1 | 3/2016 | Shah et al. |
| 2016/0134421 A1 | 5/2016 | Chen et al. |
| 2016/0188958 A1 | 6/2016 | Martin |
| 2016/0292687 A1 | 10/2016 | Kruglick et al. |
| 2017/0004487 A1 | 1/2017 | Hagen et al. |
| 2017/0011406 A1 | 1/2017 | Tunnell et al. |
| 2017/0048070 A1 | 2/2017 | Gulati et al. |
| 2017/0085587 A1 | 3/2017 | Turgeman |
| 2017/0109751 A1 | 4/2017 | Dunkelberger et al. |
| 2017/0195121 A1 | 7/2017 | Frei et al. |
| 2017/0221068 A1 | 8/2017 | Krauss et al. |
| 2017/0317833 A1 | 11/2017 | Smith et al. |
| 2017/0330174 A1 | 11/2017 | Demarinis et al. |
| 2017/0330180 A1 | 11/2017 | Song et al. |
| 2017/0331632 A1 | 11/2017 | Leoutsarakos et al. |
| 2017/0352116 A1 | 12/2017 | Pierce et al. |
| 2018/0039990 A1 | 2/2018 | Lindemann et al. |
| 2018/0191501 A1 | 7/2018 | Lindemann |
| 2018/0191695 A1 | 7/2018 | Lindemann |
| 2019/0139005 A1 | 5/2019 | Piel |
| 2019/0164156 A1 | 5/2019 | Lindemann |
| 2019/0205885 A1 | 7/2019 | Lim et al. |
| 2019/0222424 A1 | 7/2019 | Lindemann |
| 2019/0251234 A1 | 8/2019 | Liu et al. |

FOREIGN PATENT DOCUMENTS

| | | |
|---|---|---|
| CN | 101495956 A | 7/2009 |
| CN | 102077546 A | 5/2011 |
| CN | 102187701 A | 9/2011 |
| CN | 102246455 A | 11/2011 |
| CN | 102713922 A | 10/2012 |
| CN | 102763111 A | 10/2012 |
| CN | 103793632 A | 5/2014 |
| CN | 103888252 A | 6/2014 |
| CN | 103945374 A | 7/2014 |
| CN | 103999401 A | 8/2014 |
| EP | 1376302 A2 | 1/2004 |
| EP | 2357754 A1 | 8/2011 |
| JP | 06-195307 A | 7/1994 |
| JP | 09-231172 A | 9/1997 |
| JP | 2001-325469 A | 11/2001 |
| JP | 2002152189 A | 5/2002 |
| JP | 2003143136 A | 5/2003 |
| JP | 2003-219473 A | 7/2003 |
| JP | 2003-223235 A | 8/2003 |
| JP | 2003-274007 A | 9/2003 |
| JP | 2003-318894 A | 11/2003 |
| JP | 2004-118456 A | 4/2004 |
| JP | 2004348308 A | 12/2004 |
| JP | 2005-092614 A | 4/2005 |
| JP | 2005-316936 A | 11/2005 |
| JP | 2006-144421 A | 6/2006 |
| JP | 2007-148470 A | 6/2007 |
| JP | 2007220075 A | 8/2007 |
| JP | 2007-249726 A | 9/2007 |
| JP | 2008-017301 A | 1/2008 |
| JP | 2008065844 A | 3/2008 |
| JP | 2009223452 A | 10/2009 |
| JP | 2010-015263 A | 1/2010 |
| JP | 2010-505286 A | 2/2010 |
| JP | 2012-503243 A | 2/2012 |
| JP | 2013016070 A | 1/2013 |
| JP | 2013-122736 A | 6/2013 |
| JP | 2013-522722 A | 6/2013 |
| TW | 200701120 A | 1/2007 |
| TW | 201121280 A | 6/2011 |
| WO | 03017159 A1 | 2/2003 |
| WO | 2005003985 A1 | 1/2005 |
| WO | 2007023756 A1 | 3/2007 |
| WO | 2007/094165 A1 | 8/2007 |
| WO | 2009158530 A2 | 12/2009 |
| WO | 2010/032216 A1 | 3/2010 |
| WO | 2010067433 A1 | 6/2010 |
| WO | 2013082190 A1 | 6/2013 |
| WO | 2014/011997 A1 | 1/2014 |
| WO | 2014105994 A2 | 7/2014 |
| WO | 2015130734 A1 | 9/2015 |
| WO | 2017/219007 A1 | 12/2017 |

OTHER PUBLICATIONS

Roberts C., "Biometric Attack Vectors and Defences," Sep. 2006, 25 pages. Retrieved from the Internet: URL: http://otago.ourarchive.ac.nz/bitstream/handle/10523/1243/BiometricAttackVectors.pdf.

Rocha A., et al., "Vision of the Unseen: Current Trends and Challenges in Digital Image and Video Forensics," ACM Computing Surveys, 2010, 47 pages. Retrieved from the Internet: URL: http://www.wjscheirer.com/papers/wjscsur2011forensics.pdf.

Rodrigues R.N., et al., "Robustness of Multimodal Biometric Fusion Methods Against Spoof Attacks," Journal of Visual Language and Computing. 2009. 11 pages, doi:10.1016/j.jvlc.2009.01.010; Retrieved from the Internet: URL: http://cubs.buffalo.edu/govind/papers/visual09.pdf.

Ross A., et al., "Multimodal Biometrics: An Overview," Proceedings of 12th European Signal Processing Conference (EUSIPCO), Sep. 2004, pp. 1221-1224. Retrieved from the Internet: URL: http://www.csee.wvu.edu/-ross/pubs/RossMultimodaiOverviewEUSIPC004.pdf.

Schneier B., Biometrics: Uses and Abuses. Aug. 1999. Inside Risks 110 (CACM 42, Aug. 8, 1999), Retrieved from the Internet: URL: http://www.schneier.com/essay-019.pdf, 3 pages.

Schuckers, "Spoofing and Anti-Spoofing Measures," Information Security Technical Report, 2002, vol. 2002, pp. 56-62.

Schwartz et al., "Face Spoofing Detection Through Partial Least Squares and Low-Level Descriptors," International Conference on Biometrics, 2011, vol. 2011, pp. 1-8.

Smiatacz M., et al., Gdansk University of Technology. Liveness Measurements Using Optical Flow for Biometric Person Authentication. Metrology and Measurement Systems. 2012, vol. XIX, 2. pp. 257-268.

Supplementary Partial European Search Report for Application No. 13867269 dated Aug. 3, 2016, 7 pages.

T. Weigold et al., "The Zurich Trusted Information Channel—An Efficient Defence against Man-in-the-Middle and Malicious Software Attacks," P. Lipp, A.R. Sadeghi, and K.M. Koch, eds., Proc. Trust Conf. (Trust 2008), LNCS 4968, Springer-Verlag, 2008, pp. 75-91.

Tan et al., "Face Liveness Detection from a Single Image with Sparse Low Rank Bilinear Discriminative Model," European Conference on Computer Vision, 2010, vol. 2010, pp. 1-14.

The Extended M2VTS Database, [retrieved on Sep. 29, 2012], Retrieved from the Internet: URL: http://www.ee.surrey.ac.uk/CVSSP/xm2vtsdb/, 1 page.

The Online Certificate Status Protocol, OCSP, RFC2560, 22 pages.

The source for Linux information, Linux.com, [online], [retrieved on Jan. 28, 2015], 2012, 3 pages.

Transmittal of International Preliminary Report on Patentability for Patent Application No. PCT/US2013/077888 dated Jul. 9, 2015, 7 pages.

Transmittal of International Preliminary Report on Patentability from foreign counterpart PCT Patent Application No. PCT/US2014/031344 dated Oct. 1, 2015, 9 pages.

Tresadern P., et al., "Mobile Biometrics (MoBio): Joint Face and Voice Verification for a Mobile Platform", 2012, 7 pages. Retrieved from the Internet: URL: http://personal.ee.surrey.ac.uk/Personai/Norman.Poh/data/tresadern_PervComp2012draft.pdf.

Tronci R., et al., "Fusion of Multiple Clues for Photo-Attack Detection in Face Recognition Systems," International Joint Conference on Biometrics, 2011. pp. 1-6.

Uludag, Umut, and Anil K. Jain. "Attacks on biometric systems: a case study in fingerprints." Electronic Imaging 2004. International Society for Optics and Photonics, 2004, 12 pages.

(56) References Cited

OTHER PUBLICATIONS

Unobtrusive User-Authentication on Mobile Phones using Biometric Gait Recognition, 2010, 6 pages.
Validity, OSTP Framework, 24 pages, 2010.
Vassilev, A.T.; du Castel, B.; Ali, A.M., "Personal Brokerage of Web Service Access," Security & Privacy, IEEE, vol. 5, No. 5, pp. 24-31, Sep.-Oct. 2007.
WikiPedia article for Eye Tracking, 15 pages, Last Modified Jun. 21, 2014, en.wikipedia.org/wiki/Eye_tracking.
Willis N., Linux.com. Weekend Project: Take a Tour of Open Source Eye-Tracking Software. [Online] Mar. 2, 2012. [Cited: Nov. 1, 2012.], 4 pages. Retrieved from the Internet: URL: https://www.linux.com/learn/tutorials/550880-weekend-project-take-a-tour-of-opensource-eye-tracking-software.
Wilson R., "How to Trick Google's New Face Unlock on Android 4.1 Jelly Bean," Aug. 6, 2012, 5 pages, [online], [retrieved Aug. 13, 2015].
World Wide Web Consortium, W3C Working Draft: Media Capture and Streams, 2013, 36 pages.
Zhang, "Security Verification of Hardware-enabled Attestation Protocols," IEEE, 2012, pp. 47-54.
Zhao W., et al., "Face Recognition: A Literature Survey," ACM Computing Surveys, 2003, vol. 35 (4), pp. 399-458.
Zhou et al., "Face Recognition from Still Images and Videos". University of Maryland, College Park, MD 20742. Maryland : s.n., Nov. 5, 2004.pp. 1-23, Retrieved from the Internet: http://citeseerx.ist.psu.edu/viewdoc/download?doi=1 0.1.1.77.1312&rep=rep1 &type=pdf.
Kollreider K., et al., "Non-Instrusive Liveness Detection by Face Images," Image and Vision Computing, 2007, vol. 27 (3), pp. 233-244.
Kong S., et al. "Recent Advances in Visual and Infrared Face Recognition: A Review," Journal of Computer Vision and Image Understanding, 2005, vol. 97 (1), pp. 103-135.
Li J., et al., "Live Face Detection Based on the Analysis of Fourier Spectra," Biometric Technology for Human Identification, 2004, pp. 296-303.
Lubin, G., et al., "16 Heatmaps That Reveal Exactly Where People Look," Business Insider, [online], May 21, 2012, [Cited: Nov. 1, 2012], Retrieved from the Internet: URL: http://www.businessinsider.com/eye-tracking-heatmaps-2012-5?pp=1, pp. 1-21.
Maatta J., et al., "Face Spoofing Detection From Single Images Using Micro-Texture Analysis," Machine Vision Group, University of Oulu, Finland, Oulu, IEEE, [online], 2011, Retrieved from the Internet: URL: http://www.ee.oulu.fi/research/mvmp/mvg/files/pdf/131.pdf., pp. 1-7.
Marcialis G.L., et al. "First International Fingerprint Liveness Detection Competition-Livdet 2009," Image Analysis and Processing—ICIAP, Springer Berlin Heidelberg, 2009. pp. 12-23.
Mobile Device Security Using Transient Authentication, IEEE Transactions on Mobile Computing, 2006, vol. 5 (11), pp. 1489-1502.
National Science & Technology Council's Subcommittee on Biometrics. Biometrics Glossary. 33 pages, Last updated Sep. 14, 2006. NTSC. http://www.biometrics.gov/documents/glossary.pdf.
Nielsen, Jakib. useit.com. Jakob Nielsen's Alertbox—Horizontal Attention Leans Left. [Online] Apr. 6, 2010. [Cited: Nov. 1, 2012.] 4 pages. http://www.useit.com/alertbox/horizontal-attention.html.
Nielsen, Jakob. useit.com. Jakob Nielsen's Alertbox—Scrolling and Attention. [Online] Mar. 22, 2010. [Cited: Nov. 1, 2012.] 6 pages. http://www.useit.com/alertbox/scrolling-attention.html.
Non-Final Office Action from U.S. Appl. No. 13/730,761 dated Feb. 27, 2014, 24 pages.
Non-Final Office Action from U.S. Appl. No. 13/730,761 dated Sep. 9, 2014, 36 pages.
Non-Final Office Action from U.S. Appl. No. 13/730,776 dated Jul. 15, 2014, 16 pages.
Non-Final Office Action from U.S. Appl. No. 13/730,780 dated Aug. 4, 2014, 30 pages.
Non-Final Office Action from U.S. Appl. No. 13/730,780 dated Mar. 12, 2014, 22 pages.
Non-Final Office Action from U.S. Appl. No. 13/730,791 dated Jun. 27, 2014, 17 pages.
Non-Final Office Action from U.S. Appl. No. 13/730,795 dated Jan. 5, 2015, 19 pages.
Non-Final Office Action from U.S. Appl. No. 13/730,795 dated Jun. 11, 2014, 14 pages.
Non-Final Office Action from U.S. Appl. No. 14/066,273 dated Jun. 16, 2016, 43 pages.
Non-Final Office Action from U.S. Appl. No. 14/066,273 dated May 8, 2015, 31 pages.
Non-Final Office Action from U.S. Appl. No. 14/066,384 dated Jan. 7, 2015, 24 pages.
Non-Final Office Action from U.S. Appl. No. 14/066,384 dated Mar. 17, 2016, 40 pages.
Non-Final Office Action from U.S. Appl. No. 14/145,439 dated Feb. 12, 2015, 18 pages.
Non-Final Office Action from U.S. Appl. No. 14/145,466 dated Sep. 9, 2016, 13 pages.
Non-Final Office Action from U.S. Appl. No. 14/145,533 dated Jan. 26, 2015, 13 pages.
Non-Final Office Action from U.S. Appl. No. 14/145,607 dated Mar. 20, 2015, 22 pages.
Non-Final Office Action from U.S. Appl. No. 14/218,551 dated Apr. 23, 2015, 9 pages.
Non-Final Office Action from U.S. Appl. No. 14/218,551 dated Jan. 21, 2016, 11 pages.
Non-Final Office Action from U.S. Appl. No. 14/218,551 dated May 12, 2016, 11 pages.
Non-Final Office Action from U.S. Appl. No. 14/218,575 dated Feb. 10, 2015, 17 pages.
Non-Final Office Action from U.S. Appl. No. 14/218,575 dated Jan. 29, 2016, 25 pages.
Non-Final Office Action from U.S. Appl. No. 14/218,611 dated Jun. 16, 2016, 13 pages.
Non-Final Office Action from U.S. Appl. No. 14/218,677 dated Aug. 2, 2016, 15 pages.
Non-Final Office Action from U.S. Appl. No. 14/218,692 dated Nov. 4, 2015, 16 pages.
Non-Final Office Action from U.S. Appl. No. 14/218,692 dated Oct. 25, 2016, 33 pages.
Non-Final Office Action from U.S. Appl. No. 14/218,743 dated Aug. 19, 2016, 11 pages.
Non-Final Office Action from U.S. Appl. No. 14/218,743 dated Jan. 21, 2016, 12 pages.
Non-Final Office Action from U.S. Appl. No. 14/268,619 dated Aug. 24, 2015, 17 pages.
Non-Final Office Action from U.S. Appl. No. 14/268,619 dated Mar. 21, 2016, 7 pages.
Non-Final Office Action from U.S. Appl. No. 14/268,733 dated Jul. 16, 2015, 13 pages.
Non-Final Office Action from U.S. Appl. No. 14/448,641 dated Nov. 9, 2015, 21 pages.
Non-Final Office Action from U.S. Appl. No. 14/448,747 dated Aug. 19, 2016, 21 pages.
Non-Final Office Action from U.S. Appl. No. 14/448,814 dated Aug. 4, 2015, 13 pages.
Non-Final Office Action from U.S. Appl. No. 14/448,868 dated Dec. 31, 2015, 12 pages.
Non-Final Office Action from U.S. Appl. No. 14/487,992 dated Dec. 3, 2015, 15 pages.
Non-Final Office Action from U.S. Appl. No. 14/859,328 dated Sep. 15, 2016, 39 pages.
Notice of Allowance from U.S. Appl. No. 14/487,992 dated May 12, 2016, 11 pages.
Notice of Allowance from U.S. Appl. No. 13/730,761 dated Jun. 10, 2015, 15 pages.
Notice of Allowance from U.S. Appl. No. 13/730,761 dated Sep. 28, 2015, 5 pages.
Notice of Allowance from U.S. Appl. No. 13/730,776 dated Feb. 13, 2015, 16 pages.

(56) References Cited

OTHER PUBLICATIONS

Notice of Allowance from U.S. Appl. No. 13/730,776 dated Mar. 24, 2015, 3 pages.
Notice of Allowance from U.S. Appl. No. 13/730,780 dated Aug. 13, 2015, 13 pages.
Notice of Allowance from U.S. Appl. No. 13/730,791 dated Mar. 10, 2015, 17 pages.
Notice of Allowance from U.S. Appl. No. 13/730,795 dated Jan. 14, 2016, 11 pages.
Notice of Allowance from U.S. Appl. No. 13/730,795 dated May 15, 2015, 8 pages.
Notice of Allowance from U.S. Appl. No. 13/730,795 dated Sep. 17, 2015, 11 pages.
Notice of Allowance from U.S. Appl. No. 14/066,384 dated Sep. 27, 2016, 19 pages.
Notice of Allowance from U.S. Appl. No. 14/145,439 dated Jul. 6, 2015, 6 pages.
Notice of Allowance from U.S. Appl. No. 14/145,439 dated Mar. 14, 2016, 17 pages.
Notice of Allowance from U.S. Appl. No. 14/145,439 dated Oct. 28, 2015, 12 pages.
Notice of Allowance from U.S. Appl. No. 14/145,533 dated Jan. 20, 2016, 12 pages.
Notice of Allowance from U.S. Appl. No. 14/145,533 dated May 11, 2015, 5 pages.
Notice of Allowance from U.S. Appl. No. 14/145,533 dated Sep. 14, 2015, 13 pages.
Notice of Allowance from U.S. Appl. No. 14/145,607 dated Feb. 1, 2016, 28 pages.
Notice of Allowance from U.S. Appl. No. 14/145,607 dated Sep. 2, 2015, 19 pages.
Notice of Allowance from U.S. Appl. No. 14/268,619 dated Oct. 3, 2016, 65 pages.
Notice of Allowance from U.S. Appl. No. 14/268,619 dated Jul. 19, 2016, 5 pages.
Notice of Allowance from U.S. Appl. No. 14/268,686 dated Apr. 18, 2016, 16 pages.
Notice of Allowance from U.S. Appl. No. 14/268,686 dated Jul. 8, 2016, 4 pages.
Notice of Allowance from U.S. Appl. No. 14/268,686 dated Mar. 30, 2016, 38 pages.
Notice of Allowance from U.S. Appl. No. 14/268,686 dated Nov. 5, 2015, 23 pages.
Notice of Allowance from U.S. Appl. No. 14/268,733 dated Sep. 23, 2016, 8 pages.
Notice of Allowance from U.S. Appl. No. 14/448,641 dated Jun. 7, 2016, 13 pages.
Notice of Allowance from U.S. Appl. No. 14/448,697 dated Jan. 14, 2016, 23 pages.
Notice of Allowance from U.S. Appl. No. 14/448,697 dated May 20, 2016, 14 pages.
Notice of Allowance from U.S. Appl. No. 14/448,697 dated Sep. 1, 2016, 3 pages.
Notice of Allowance from U.S. Appl. No. 14/448,697 dated Sep. 15, 2015, 14 pages.
Notice of Allowance from U.S. Appl. No. 14/487,992 dated Dec. 27, 2016, 28 pages.
Notice of Allowance from U.S. Appl. No. 14/487,992 dated Sep. 6, 2016, 26 pages.
Notification Concerning Transmittal of International Preliminary Report on Patentability for Application No. PCT/US14/39627, dated Dec. 10, 2015, 8 pages.
Notification of Transmittal of the International Search Report and the Written Opinion from counterpart Patent Cooperation Treaty Application No. PCT/US13/77888, dated Aug. 4, 2014, 10 pages.
Notification of Transmittal of the International Search Report and the Written Opinion from counterpart Patent Cooperation Treaty Application No. PCT/US14/31344, dated Nov. 3, 2014, 16 pages.
Notification of Transmittal of the International Search Report and the Written Opinion from counterpart Patent Cooperation Treaty Application No. PCT/US14/39627, dated Oct. 16, 2014, 10 pages.
Notification of Transmittal of the International Search Report and the Written Opinion from counterpart Patent Cooperation Treaty Application No. PCT/US15/50348, dated Dec. 22, 2015, 9 pages.
Notification of Transmittal of the International Search Report and the Written Opinion from counterpart Patent Cooperation Treaty Application No. PCT/US2015/042786, dated Oct. 16, 2015, 8 pages.
Notification of Transmittal of the International Search Report and the Written Opinion from counterpart Patent Cooperation Treaty Application No. PCT/US2015/042799, dated Oct. 16, 2015, 8 pages.
Notification of Transmittal of the International Search Report and the Written Opinion from counterpart Patent Cooperation Treaty Application No. PCT/US2015/042870, dated Oct. 30, 2015, 9 pages.
Notification of Transmittal of the International Search Report and the Written Opinion from counterpart Patent Cooperation Treaty Application No. PCT/US2015/42783, dated Oct. 19, 2015, 13 pages.
Notification of Transmittal of the International Search Report and the Written Opinion from counterpart Patent Cooperation Treaty Application No. PCT/US2015/42827, dated Oct. 30, 2015, 9 pages.
Notification of Transmittal or International Search Report and Written Opinion from PCT/US2015/028927, dated Jul. 30, 2015, 12 pages.
Pan G., et al., "Liveness Detection for Face Recognition" in: Recent Advances in Face Recognition, 2008, pp. 109-124, Vienna : I-Tech, 2008, Ch. 9, ISBN: 978-953-7619-34-3.
Pan G., et al., "Monocular Camera-based Face Liveness Detection by Combining Eyeblink and Scene Context," pp. 215-225, s.l. : Springer Science+Business Media, LLC, Aug. 4, 2010. Retrieved from the Internet: URL: http://www.cs.zju.edu.cn/~gpan/publication/2011-TeleSysliveness.pdf.
Peng Y., et al., "RASL: Robust Alignment by Sparse and Low-Rank Decomposition for Linearly Correlated Images", IEEE Conference on Computer Vision and Pattern Recognition, 2010, pp. 763-770. Retrieved from the Internet: URL: http://yima.csl.illinois.edu/psfile/RASL_CVPR10.pdf.
Phillips P. J., et al., "Biometric Image Processing and Recognition," Chellappa, 1998, Eusipco, 8 pages.
Phillips P.J., et al., "Face Recognition Vendor Test 2002: Evaluation Report," s.l. : NISTIR 6965, 2002, 56 pages. Retrieved from the Internet: URL: http://www.facerec.org/vendors/FRVT2002_Evaluation_Report.pdf.
Phillips P.J., et al., "FRVT 2006 and ICE 2006 Large-Scale Results", NIST IR 7408, Gaithersburg, NIST, 2006, Mar. 29, 2007, pp. 1-55.
Pinto A., et al., "Video-Based Face Spoofing Detection through Visual Rhythm Analysis," Los Alamitos : IEEE Computer Society Conference Publishing Services, 2012, Conference on Graphics, Patterns and Images, 8 pages.(SIBGRAPI). Retrieved from the Internet: URL: http://sibgrapi.sid.inpe.br/rep/sid.inpe.br/sibgrapi/2012/07.13.21.16?mirror=sid.inpe.br/ banon/2001/03.30.15.38.24&metadatarepository=sid.inpe.br/sibgrapi/2012/07.13.21.1 6.53.
Quinn G.W., et al., "Performance of Face Recognition Algorithms on Compressed Images", NIST Inter Agency Report 7830, NIST, Dec. 4, 2011, 35 pages.
Ratha N.K., et al., "An Analysis of Minutiae Matching Strength," Audio-and Video-Based Biometric Person Authentication, Springer Berlin Heidelberg, 2001, 7 pages.
Ratha N.K., et al., "Enhancing Security and Privacy in Biometrics-Based Authentication Systems," IBM Systems Journal, 2001, vol. 40 (3), pp. 614-634.
Communication pursuant to Rules 161(2) and 162 EPC for EP Application No. 15826364.0, dated Mar. 7, 2017, 2 pages.
Extended European Search Report from European Patent Application No. 14770682.4, dated Jan. 17, 2017, 14 pages.
Final Office Action from U.S. Appl. No. 14/145,466, dated Apr. 13, 2017, 61 pages.
Final Office Action from U.S. Appl. No. 14/218,611, dated Jan. 27, 2017, 14 pages.

(56) References Cited

OTHER PUBLICATIONS

Final Office Action from U.S. Appl. No. 14/218,692, dated Feb. 28, 2017, 27 pages.
Final Office Action from U.S. Appl. No. 14/218,743, dated Mar. 3, 2017, 67 pages.
Final Office Action from U.S. Appl. No. 14/448,747, dated Feb. 13, 2017, 74 pages.
Final Office Action from U.S. Appl. No. 14/859,328, dated Mar. 6, 2017, 26 pages.
Kim et al., "Secure User Authentication based on the Trusted Platform for Mobile Devices," EURASIP Journal on Wireless Communications and Networking, pp. 1-15.
Non-Final Office Action from U.S. Appl. No. 14/066,273 dated May 18, 2017, 46 pages.
Non-Final Office Action from U.S. Appl. No. 14/218,504, dated Feb. 27, 2017, 12 pages.
Non-Final Office Action from U.S. Appl. No. 14/218,575, dated May 4, 2017, 88 pages.
Non-Final Office Action from U.S. Appl. No. 14/218,677, dated Feb. 10, 2017, 18 pages.
Non-final Office Action from U.S. Appl. No. 14/268,563, dated Apr. 21, 2017, 83 pages.
Non-Final Office Action from U.S. Appl. No. 14/448,814, dated Apr. 5, 2017, 57 pages.
Notice of Allowance from U.S. Appl. No. 14/066,384, dated May 23, 2017, 50 pages.
Notice of Allowance from U.S. Appl. No. 14/218,551, dated Feb. 8, 2017, 56 pages.
Notice of Allowance from U.S. Appl. No. 14/218,551, dated Mar. 1, 2017, 7 pages.
Notice of Allowance from U.S. Appl. No. 14/268,733, dated Jan. 20, 2017, 62 pages.
Notice of Allowance from U.S. Appl. No. 14/448,868, dated Apr. 27, 2017, 62 pages.
Notice of Allowance from U.S. Appl. No. 14/448,868, dated Mar. 23, 2017, 57 pages.
Notice of Allowance from U.S. Appl. No. 14/487,992, dated Apr. 12, 2017, 14 pages.
Office Action from foreign counterpart Taiwan Patent Application No. 102148853, dated Feb. 17, 2017, 9 pages.
Partial Supplementary European Search Report from European Patent Application No. 14770682.4, dated Oct. 14, 2016, 8 pages.
TechTarget, What is network perimeter? Definition from WhatIs.com downloaded from http://searchnetworking.techtarget.com/definition/network-perimeter on Apr. 14, 2017, 5 pages.
Abate A., et al.,"2D and 3D face recognition: A survey", 2007, pp. 1885-1906.
Advisory Action from U.S. Appl. No. 13/730,791 dated Jan. 23, 2015, 4 pages.
Akhtar Z., et al., "Spoof Attacks on Multimodal Biometric Systems", International Conference on Information and Network Technology, 2011, vol. 4, pp. 46-51.
Bao, W., et al., "A liveness detection method for face recognition based on optical flow field", 2009, pp. 233-236, http://ieexplore.ieee.org/stamp/stamp.jsp?tp=&arnumber=5054589&isnumber=5054562.
Barker E., et al., "Recommendation for key management Part 3: Application—Specific Key Management Guidance", NIST Special Publication 800-57, 2009, pp. 1-103.
BehavioSec, "Measuring FAR/FRR/EER in Continuous Authentication," Stockholm, Sweden (2009), 8 pages.
Brickell, E., et al., Intel Corporation; Jan Camenish, IBM Research; Liqun Chen, HP Laboratories. "Direct Anonymous Attestation". Feb. 11, 2004, pp. 1-28 [online]. Retrieved from the Internet: URL:https://eprint.iacr.org/2004/205.pdf.
Chakka M., et al., "Competition on Counter Measures to 2-D Facial Spoofing Attacks". 6 pages .2011. http://www.csis.pace.edu/-ctappert/dps/IJCB2011/papers/130.pdf. 978-1-4577-1359-0/11.

Chen L., et al., "Flexible and scalable digital signatures in TPM 2.0." Proceedings of the 2013 ACM SIGSAC conference on Computer & communications security. ACM, 2013, 12 pages.
Chetty G. School of ISE University of Canberra Australia. "Multilevel liveness verification for face-voice biometric authentication". BYSM-2006 Symposium. Baltimore: BYSM-Symposium 9 pages. Sep. 19, 2006. http://www.biometrics.org/bc2006/presentations/Tues_Sep_19/BSYM/19_Chetty_research.pdf.
Continuous User Authentication Using Temporal Information, http://www.cse.msu.edu/biometrics/Publications/Face/NiinumaJain_ContinuousAuth_SPIE10.pdf, 11 pages.
Crazy Egg Heatmap Shows Where People Click on Your Website, 2012, 3 pages, www.michaelhartzell.com/Blog/bid/92970/Crazy-Egg-Heatmap-shows-where-people-click-on-your-website).
Dawei Zhang; Peng Hu, "Trusted e-commerce user agent based on USB Key", Proceedings of the International MultiConference of Engineers and Computer Scientists 2008 vol. I, IMECS 2008, Mar. 19-21, 2008, Hong Kong, 7 pages.
Delac K. et al., Eds., InTech, Jun. 1, 2008, Retrieved from the Internet:, ISBN 978-953-7619-34-3, Uploaded as individual Chapters 1-15, 15 pages.
Doherty, et al., Internet Engineering Task Force (IETF), "Dynamic Symmetric Key Provisioning Protocol (DSKPP)", Dec. 2010, 105 pages.
Edited by Kresimir Delac, Mislay Grgic and Marian Stewart Bartlett. s.l. : InTech Jun. 1, 2008. http://cdn.intechopen.com/finals/81/InTech-Recent_advances_in_face_recognition.zip. ISBN 978-953-7619-34-3. Uploaded as Chapters 1-15.
Extended European Search Report for Application No. 13867269, dated Nov. 4, 2016, 10 pages.
Extended European Search Report for Application No. 14803988.6, dated Dec. 23, 2016, 10 pages.
Final Office Action from U.S. Appl. No. 13/730,761 dated Jan. 15, 2015, 31 pages.
Final Office Action from U.S. Appl. No. 13/730,761 dated Jul. 8, 2014, 36 pages.
Final Office Action from U.S. Appl. No. 13/730,776 dated Nov. 3, 2014, 20 pages.
Final Office Action from U.S. Appl. No. 13/730,780 dated Jan. 27, 2015, 30 pages.
Final Office Action from U.S. Appl. No. 13/730,780 dated May 12, 2014, 34 pages.
Final Office Action from U.S. Appl. No. 13/730,791 dated Nov. 13, 2014, 22 pages.
Final Office Action from U.S. Appl. No. 13/730,795 dated Aug. 14, 2014, 20 pages.
Final Office Action from U.S. Appl. No. 14/066,273 dated Feb. 11, 2016, 29 pages.
Final Office Action from U.S. Appl. No. 14/066,273 dated Jan. 10, 2017, 24 pages.
Final Office Action from U.S. Appl. No. 14/066,384 dated Aug. 20, 2015, 23 pages.
Final Office Action from U.S. Appl. No. 14/218,551 dated Sep. 9, 2015, 15 pages.
Final Office Action from U.S. Appl. No. 14/218,551 dated Sep. 16, 2016, 11 pages.
Final Office Action from U.S. Appl. No. 14/218,575 dated Aug. 7, 2015, 19 pages.
Final Office Action from U.S. Appl. No. 14/218,575 dated Jul. 7, 2016, 29 pages.
Final Office Action from U.S. Appl. No. 14/218,692 dated Mar. 2, 2016, 24 pages.
Final Office Action from U.S. Appl. No. 14/268,619 dated Dec. 14, 2015, 10 pages.
Final Office Action from U.S. Appl. No. 14/268,733 dated Jan. 15, 2016, 14 pages.
Final Office Action from U.S. Appl. No. 14/448,814 dated Feb. 16, 2016, 14 pages.
Final Office Action from U.S. Appl. No. 14/448,814 dated Jun. 14, 2016, 17 pages.
Final Office Action from U.S. Appl. No. 14/448,868 dated Aug. 19, 2016, 11 pages.

(56) References Cited

OTHER PUBLICATIONS

Grother, P.J., et al., NIST. Report on the Evaluation of 2D Still-Image Face Recognition Algorithms, NIST IR 7709. s.l, NIST, 2011, Jun. 22, 2010, pp. 1-58.
GSM Arena. [Online] Nov. 13, 2011, [Cited: Sep. 29, 2012.], 2 pages, [retrieved on Aug. 18, 2015]. Retrieved from the Internet: URL: http://www.gsmarena.com/ice_cream_sandwichs_face_unlock_duped_using_a_photograph-news-3377.php.
Heikkila M., et al., "A Texture-Based Method for Modeling the Background and Detecting Moving Objects", Oulu : IEEE , Jun. 22 2005, Draft, Retrieved from the Internet: URL: , 16 pages.
Hernandez, T., "But What Does It All Mean? Understanding Eye-Tracking Results (Part 3)", Sep. 4, 2007, 2 pages. EyeTools. Part III: What is a heatmap . . . really? [Online] [Cited: Nov. 1, 2012.] Retrieved from the Internet: URL:http://eyetools.com/articles/p3-understanding-eye-tracking-what-is-a-heatmap-really.
Himanshu, et al., "A Review of Face Recognition". International Journal of Research in Engineering & Applied Sciences. Feb. 2012, vol. 2, pp. 835-846. Retrieved from the Internet: URL:http://euroasiapub.org/IJREAS/Feb2012/81.pdf.
Huang L., et al., "Clickjacking: Attacks and Defenses". S.I. : Usenix Security 2012, pp. 1-16, 2012 [online]. Retrieved from the Internet: URL:https://www.usenix.org/system/files/conference/usenixsecurity12/sec12-fina139.pdf.
International Preliminary Report on Patentability for Application No. PCT/US2015/028924 dated Nov. 17, 2016, 9 pages.
International Preliminary Report on Patentability for Application No. PCT/US2015/028927 dated Nov. 17, 2016, 10 pages.
International Search Report and Written Opinion for Application No. PCT/US2015/028924 dated Jul. 30, 2015, 10 pages.
Jafri R., et al. "A Survey of Face Recognition Techniques," Journal of Information Processing Systems, 2009, vol. 5 (2), pp. 41-68.
Julian J., et al., "Biometric Enabled Portable Trusted Computing Platform," Trust Security and Privacy in Computing and Communications (TRUSTCOM), 2011 IEEE 10th International Conference on Nov. 16, 2011, pp. 436-442, XP032086831, DOI:10.1109/TRUSTCOM.2011.56, ISBN: 978-1-4577-2135-9.
Kollreider K., et al., "Evaluating Liveness by Face Images and the Structure Tensor," Halmstad, Sweden: s.n., Halmstad University, SE-30118, Sweden, [online], 2005, Retrieved from the Internet: URL: http://citeseerx.ist.psu.edu/viewdoc/download?doi=10.1.1.62.6534&rep=rep1 &type=pdf, pp. 75-80.
Extended European Search Report for Application No. 15786487.7, dated Oct. 23, 2017, 8 pages.
Extended European Search Report for Application No. 15786796.1, dated Nov. 3, 2017, 9 pages.
Extended European Search Report for Application No. 15826660.1, dated Nov. 16, 2017, 9 pages.
Extended European Search Report for Application No. 15827334.2, dated Nov. 17, 2017, 8 pages.
Final Office Action from U.S. Appl. No. 14/066,273, dated Sep. 8, 2017, 30 pages.
Final Office Action from U.S. Appl. No. 14/218,504, dated Sep. 12, 2017, 83 pages.
Final Office Action from U.S. Appl. No. 14/218,575, dated Jul. 31, 2017, 42 pages.
Final Office Action from U.S. Appl. No. 14/218,677, dated Sep. 28, 2017, 16 pages.
Final Office Action from U.S. Appl. No. 14/268,563, dated Nov. 3, 2017, 46 pages.
Final Office Action from U.S. Appl. No. 14/448,814 dated Oct. 6, 2017, 24 pages.
First Office Action and Search Report from foreign counterpart China Patent Application No. 201380068869.3, dated Sep. 19, 2017, 17 pages.
First Office Action and Search Report from foreign counterpart China Patent Application No. 201480025959.9, dated Jul. 7, 2017, 10 pages.
International Preliminary Report on Patentability for Application No. PCT/US2015/042786, dated Feb. 9, 2017, 7 pages.
International Preliminary Report on Patentability for Application No. PCT/US2015/042799, dated Feb. 9, 2017, 7 pages.
International Preliminary Report on Patentability for Application No. PCT/US2015/042870, dated Feb. 9, 2017, 8 pages.
International Preliminary Report on Patentability for Application No. PCT/US2015/050348, dated Mar. 30, 2017, 7 pages.
International Preliminary Report on Patentability for Application No. PCT/US2015/42783, dated Feb. 9, 2017, 12 pages.
International Preliminary Report on Patentability for Application No. PCT/US2015/42827, dated Feb. 9, 2017, 6 pages.
International Search Report and Written Opinion for Application No. PCT/U52017/045534, dated Nov. 27, 2017, 14 pages.
Kim H.C., et al., "A Design of One-Time Password Mechanism Using Public Key Infrastructure," Networked Computing and Advanced Information Management, 2008, NCM'08, 4th International Conference on IEEE, Sep. 2, 2008, pp. 18-24.
Martins R A., et al., "A Potpourri of Authentication Mechanisms the Mobile Device Way," CISTI, Jan. 2013, pp. 843-848.
Non-Final Office Action from U.S. Appl. No. 14/218,611, dated Sep. 19, 2017, 76 pages.
Non-Final Office Action from U.S. Appl. No. 14/218,692, dated Sep. 19, 2017, 37 pages.
Non-Final Office Action from U.S. Appl. No. 14/218,743, dated Aug. 2, 2017, 24 pages.
Non-Final Office Action from U.S. Appl. No. 14/859,328, dated Jul. 14, 2017, 29 pages.
Non-Final Office Action from U.S. Appl. No. 15/396,452 dated Oct. 13, 2017, 76 pages.
Non-Final Office action from U.S. Appl. No. 15/595,460, dated Jul. 27, 2017, 09 pages.
Notice of Allowance from U.S. Appl. No. 14/066,384, dated Dec. 1, 2017, 23 pages.
Notice of Allowance from U.S. Appl. No. 14/066,384, dated Jul. 26, 2017, 20 pages.
Notice of Allowance from U.S. Appl. No. 14/218,551, dated Aug. 16, 2017, 24 pages.
Notice of Allowance from U.S. Appl. No. 14/218,551, dated Dec. 13, 2017, 13 pages.
Notice of Allowance from U.S. Appl. No. 14/448,747, dated Jun. 20, 2017, 14 pages.
Notice of Allowance from U.S. Appl. No. 14/448,868, dated Jun. 26, 2017, 14 pages.
Notice of Allowance from U.S. Appl. No. 14/448,868, dated Nov. 17, 2017, 15 pages.
Notice of Allowance from U.S. Appl. No. 14/487,992, dated Jul. 17, 2017, 8 pages.
Notice of Allowance from U.S. Appl. No. 14/487,992, dated Jun. 14, 2017, 14 pages.
Office Action and Search Report from foreign counterpart Chinese Patent Application No. 201480031042.X, dated Dec. 4, 2017, 20 pages.
Starnberger G., et al., "QR-TAN: Secure Mobile Transaction Authentication," Availability, Reliability and Security, 2009, ARES'09, International Conference on IEEE, Mar. 16, 2009, pp. 578-585.
Uymatiao M.L.T., et al., "Time-based OTP authentication via secure tunnel (TOAST); A mobile TOTP scheme using TLS seed exchage and encrypted offline keystore," 2014 4th IEEE International Conference on Information Science and Technology, IEEE, Apr. 26, 2014, pp. 225-229.
Office Action and Search Report from foreign counterpart Taiwan Patent Application No. 106125986, dated Mar. 19, 2018, 6 pages.
Office Action from foreign counterpart Japanese Patent Application No. 2015-550778, dated Feb. 7, 2018, 14 pages.
"OpenID Connect Core 1.0—draft 17," Feb. 3, 2014, 70 pages.
Watanabe H., et al., "The Virtual Wearable Computing System Assumed Widely Movement," the multimedia, distribution and cooperation which were taken into consideration, mobile (DICOMO2009) symposium collected-papers [CD-ROM], Japan, Information Processing Society of Japan, Jul. 1, 2009, and vol. 2009 (1), pp. 1406-1414. (Abstract only in English).
Chen L., "Direct Anonymous Attestation," Oct. 12, 2005, retrieved from https://trustedcomputinggroup.org/wp-content/uploads/051012_DAA-slides.pdf on Apr. 2, 2018, 27 pages.

(56) References Cited

OTHER PUBLICATIONS

Communication pursuant to Article 94(3) EPC for Application No. 15786796.1, dated Oct. 23, 2018, 4 pages.
Communication Pursuant to Rules 70(2) and 70a(2) EPC for European Application No. 15786487.7, dated Nov. 9, 2017, 1 page.
Communication Pursuant to Rules 70(2) and 70a(2) EPC for European Application No. 15827363.7, dated Mar. 13, 2018, 1 page.
Corrected Notice of Allowance from U.S. Appl. No. 15/396,452, dated Aug. 30, 2018, 17 pages.
Corrected Notice of Allowability from U.S. Appl. No. 15/595,460, dated Nov. 20, 2018, 38 pages.
Corrected Notice of Allowance from U.S. Appl. No. 14/066,273, dated Feb. 8, 2018, 4 pages.
Corrected Notice of Allowance from U.S. Appl. No. 15/396,454, dated Sep. 28, 2018, 24 pages.
Corrected Notice of Allowance from U.S. Appl. No. 15/595,460, dated Dec. 11, 2018, 70 pages.
Decision to Grant from foreign counterpart Japanese Patent Application No. 2015-550778, dated Jul. 25, 2018, 6 pages.
Extended European Search Report for Application No. 15826364.0, dated Feb. 20, 2018, 6 pages.
Extended European Search Report for Application No. 15827363.1, dated Feb. 22, 2018, 7 pages.
Extended European Search Report for Application No. 15828152.7, dated Feb. 20, 2018, 8 pages.
Extended European Search Report for Application No. 15841530.7, dated Mar. 26, 2018, 8 pages.
Final Office Action from U.S. Appl. No. 14/145,466, dated Nov. 20, 2018, 28 pages.
Final Office Action from U.S. Appl. No. 14/218,677, dated May 31, 2018, 16 pages.
Final Office Action from U.S. Appl. No. 15/229,254, dated Aug. 23, 2018, 16 pages.
Final Office Action from U.S. Appl. No. 14/218,575 dated Sep. 5, 2018, 19 pages.
Final Office Action from U.S. Appl. No. 14/218,611, dated May 3, 2018, 20 pages.
Final Office Action from U.S. Appl. No. 14/218,692, dated Apr. 17, 2018, 99 pages.
Final Office Action from U.S. Appl. No. 14/218,743, dated Feb. 7, 2018, 27 pages.
Final Office Action from U.S. Appl. No. 15/396,452, dated Feb. 27, 2018, 24 pages.
Final Office Action from U.S. Appl. No. 15/595,460, dated Jan. 11, 2018, 19 pages.
Monden A., et al., "Remote Authentication Protocol," Multimedia, Distributed, Cooperative and Mobile Symposium (DICOM02007), Information Processing Society of Japan, Jun. 29, 2007, pp. 1322-1331.
Non-Final Office Action from U.S. Appl. No. 14/218,692, dated Jul. 31, 2018, 40 pages.
Non-Final Office Action from U.S. Appl. No. 14/145,466, dated May 11, 2018, 33 pages.
Non-Final Office Action from U.S. Appl. No. 14/268,563, dated Jun. 28, 2018, 56 pages.
Non-Final Office Action from U.S. Appl. No. 15/881,522, dated Jun. 6, 2018, 87 pages.
Non-Final Office Action from U.S. Appl. No. 15/900,620, dated Oct. 19, 2018, 66 pages.
Non-Final Office Action from U.S. Appl. No. 14/218,575, dated Mar. 8, 2018, 29 pages.
Non-Final Office Action from U.S. Appl. No. 14/218,677, dated Feb. 2, 2018, 25 pages.
Non-Final Office Action from U.S. Appl. No. 15/229,254, dated Feb. 14, 2018, 75 pages.
Non-Final Office Action from U.S. Appl. No. 15/595,460, dated May 3, 2018, 20 pages.
Non-Final Office Action from U.S. Appl. No. 15/954,188, dated Sep. 7, 2018, 41 pages.
Notice of Allowance from U.S. Appl. No. 15/396,454, dated Nov. 16, 2018, 34 pages.
Notice of Allowance from foreign counterpart Chinese Patent Application No. 201480031042.X, dated Jul. 23, 2018, 5 pages.
Notice of Allowance from foreign counterpart Taiwan Patent Application No. 106125986, dated Jul. 6, 2018, 7 pages.
Notice of Allowance from U.S. Appl. No. 14/218,743, dated Aug. 1, 2018, 18 pages.
Notice of Allowance from U.S. Appl. No. 14/448,814, dated May 9, 2018, 42 pages.
Notice of Allowance from U.S. Appl. No. 15/396,452, dated Jul. 2, 2018, 23 pages.
Notice of Allowance from U.S. Appl. No. 14/066,273, dated Jan. 18, 2018, 26 pages.
Notice of Allowance from U.S. Appl. No. 14/218,504, dated May 31, 2018, 95 pages.
Notice of Allowance from U.S. Appl. No. 14/218,692, dated Dec. 5, 2018, 13 pages.
Notice of Allowance from U.S. Appl. No. 14/859,328, dated Feb. 1, 2018, 18 pages.
Notice of Allowance from U.S. Appl. No. 15/396,454, dated Sep. 18, 2018, 79 pages.
Notice of Allowance from U.S. Appl. No. 15/595,460, dated Oct. 9, 2018, 8 pages.
Notification for Granting Patent Right and Search Report from foreign counterpart Chinese Patent Application No. 201380068869.3, dated May 4, 2018, 10 pages.
Notification of Reason for Rejection from foreign counterpart Japanese Patent Application No. 2016-505506, dated Feb. 13, 2018, 6 pages.
Notification of Reasons for Rejection from foreign counterpart Japanese Patent Application No. 2016-0516743, dated Apr. 23, 2018, 12 pages.
OASIS Standard, "Authentication Context for the OASIS Security Assertion Markup Language (SAML) V2.0," Mar. 15, 2005, 70 pages.
Communication pursuant to Article 94(3) EPC for Application No. 15841530.7, dated Feb. 8, 2019, 4 pages.
International Search Report and Written Opinion for PCT Application No. PCT/US2018/062608, dated Mar. 28, 2019, 12 pages.
Non-Final Office Action from U.S. Appl. No. 14/268,563, dated May 13, 2019, 47 pages.
Non-Final Office Action from U.S. Appl. No. 15/229,233, dated Apr. 18, 2019, 87 pages.
Notice of Allowance from U.S. Appl. No. 14/218,575, dated Apr. 10, 2019, 32 pages.
Notice of Allowance from U.S. Appl. No. 15/595,460, dated Mar. 14, 2019, 32 pages.
Notice of Allowance from U.S. Appl. No. 15/954,188, dated Apr. 26, 2019, 5 pages.
Office Action from foreign counterpart Japanese Patent Application No. 2017-505504, dated Apr. 15, 2019, 3 pages.
RF 6749: Hardt D, "The OAuth 2.0 Authorization Framework," Internet Engineering Task Force(IETF), Request for Comments: 6749, retrieved from https://tools.ietf.org/pdf/rfc6749.pdf, Oct. 2012, pp. 1-76.
Babich A., "Biometric Authentication. Types of Biometric Identifiers," Haaga-Helia, University of Applied Sciences, 2012, retrieved from https://www.theseus.fi/bitstream/handle/10024/44684/Babich_Aleksandra.pdf, 56 pages.
Final Office Action from U.S. Appl. No. 14/268,563, dated Dec. 27, 2018, 47 pages.
Final Office Action from U.S. Appl. No. 15/881,522, dated Feb. 6, 2019, 21 pages.
Final Office Action from U.S. Appl. No. 15/954,188, dated Feb. 25, 2019, 8 pages.
International Preliminary Report on Patentability for Application No. PCT/US2017/045534, dated Feb. 14, 2019, 11 pages.
Non-Final Office Action from U.S. Appl. No. 14/218,677, dated Dec. 26, 2018, 32 pages.
Non-Final Office Action from U.S. Appl. No. 14/218,611, dated Feb. 7, 2019, 27 pages.

(56) References Cited

OTHER PUBLICATIONS

Non-Final Office Action from U.S. Appl. No. 15/229,254, dated Feb. 26, 2019, 46 pages.
Notice of Allowance from U.S. Appl. No. 15/396,454, dated Jan. 28, 2019, 23 pages.
Notice of Allowance from U.S. Appl. No. 15/900,620, dated Feb. 15, 2019, 20 pages.
Notice of Reasons for Rejection from foreign counterpart Japanese Patent Application No. 2017-505513, dated Oct. 22, 2018, 6 pages.
"Analysis of Advertising Effectiveness with Eye Tracking"—Theuner et al, Department of Marketing, Ludwigshafen University, Aug. 2008 http://www.noldus.com/mb2008/individual_papers/FPS_eye_tracking/FPS_eye_tracking_Theuner.pdf.
Communication pursuant to Article 94(3) EPC, EP App. No. 13867269.6, dated Aug. 30, 2019, 6 pages.
Communication Pursuant to Article 94(3) EPC, EP App. No. 14770682.4, dated Jun. 6, 2019, 5 pages.
Communication pursuant to Article 94(3) EPC, EP App. No. 15786796.1, dated May 31, 2019, 5 pages.
Communication pursuant to Article 94(3) EPC, EP App. No. 15826660.1, dated Jul. 4, 2019, 6 pages.
Communication Pursuant to Article 94(3) EPC, EP App. No. 15827334.2, dated Apr. 30, 2019, 9 pages.
Communication Pursuant to Article 94(3) EPC, EP App. No. 15828152.7, dated Jan. 31, 2019, 7 pages.
Communication pursuant to Article 94(3) EPC, EP. App. No. 14803988.6, dated Oct. 25, 2019, 5 pages.
Corrected Notice of Allowance, U.S. Appl. No. 14/218,575, dated Jun. 24, 2019, 16 pages.
Decision to Grant a Patent, JP App. No. 2016-516743 dated Jan. 10, 2019, 5 pages.
Final Office Action, U.S. Appl. No. 14/218,611, dated Aug. 2, 2019, 26 pages.
Final Office Action, U.S. Appl. No. 14/218,677, dated Jun. 10, 2019, 15 pages.
Final Office Action, U.S. Appl. No. 14/268,563, dated Nov. 8, 2019, 36 pages.
Final Office Action, U.S. Appl. No. 15/229,233, dated Sep. 24, 2019, 18 pages.
First Office Action and Search Report, CN App. No. 201580040813.6, dated Jun. 28, 2019, 19 pages.
First Office Action and Search Report, CN App. No. 201580040814, dated Jul. 10, 2019, 10 pages. (Translation available only for the office action).
Fourth Office Action, CN App. No. 201480025959.9, dated Apr. 12, 2019, 10 pages.
Hebbes L, et al., "2-Factor Authentication with 2D Barcodes," Proceedings of the Fifth International Symposium on Human Aspects of Information Security & Assurance (Haisa 2011), 2011, pp. 86-96.
IEEE P802.11ah/D5.0: "Part 11: Wireless LAN Medium Access Control (MAC) and Physical Layer (PHY) Specifications, Amendment 2: Sub 1 GHz License Exempt Operation," IEEE Draft Standard for Information technology-Telecommunications and information exchange between systems, Local and metropolitan area networks-Specific requirements, Mar. 2015, 632 pages.
IEEE Std 802.11-2012: "Part 11: Wireless LAN Medium Access Control (MAC) and Physical Layer (PHY) Specifications," IEEE Standard for Information technology-Telecommunicationsand information exchange between systems, Local and metropolitan area networks-Specific requirements, Mar. 29, 2012, 2793 pages.
IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology-Telecommunicationsand information exchange between systems, Local and metropolitan area networks-Specific requirements, Dec. 18, 2013, 425 pages.
International Search Report and Written Opinion, PCT App. No. PCT/US2019/013199, dated Apr. 1, 2019, 12 pages.

Non-Final Office Action, U.S. Appl. No. 14/218,677, dated Oct. 30, 2019, 5 pages.
Non-Final Office Action, U.S. Appl. No. 15/881,522, dated Jul. 16, 2019, 39 pages.
Notice of Abandonment, U.S. Appl. No. 16/209,838, dated Sep. 4, 2019, 2 pages.
Notice of Allowance, TW App. No. 102148853, dated Jul. 6, 2017, 3 pages.
Notice of Allowance, U.S. Appl. No. 15/229,254, dated Sep. 11, 2019, 8 pages.
Notice of Allowance, U.S. Appl. No. 15/595,460, dated May 17, 2019, 10 pages.
Notice of Reasons for Refusal, JP App. No. 2018-153218, dated Jun. 5, 2019, 7 pages.
Notice of Reasons for Rejection, JP App. No. 2016-566924, dated Mar. 7, 2019, 23 pages.
Notification of Reasons for Refusal, JP App. No. 2017-505072, dated Apr. 15, 2019, 8 paegs.
Notification of Reasons for Refusal, JP App. No. 2017-514840, dated Apr. 1, 2019, 10 pages.
Notification of Reasons for Rejection, JP App. No. 2016-566912, dated Jan. 31, 2019, 11 pages.
Office Action and Search Report, TW App. No. 107127837, dated Jun. 26, 2019, 4 pages.
Rejection Judgment, JP App. No. 2017-505513, dated Jun. 17, 2019, 4 pages.
Requirement for Restriction/Election, U.S. Appl. No. 15/822,531, dated Oct. 16, 2019, 6 pages.
Saito T., "Mastering TCP/IP, Information Security," Ohmsha Ltd., dated Sep. 1, 2013, pp. 77-80 (7 pages).
Schmidt et al., "Trusted Platform Validation and Management," International Journal of Dependable and Trustworth Information Systems, vol. 1, No. 2, Apr.-Jun. 2010, pp. 1-31.
Decision to Grant, JP App. No. 2016-566912, dated Dec. 26, 2019, 3 pages (2 pages of English Translation and 1 pages of Original Document).
Delac K. et al., Eds., Image Compression in Face Recognition-a Literature Survey, InTech, Jun. 1, 2008, ISBN 978-953-7619-34-3, Uploaded as individual Chapters 1-15, downloaded from https://www.intechopen.com/books/recent_advances_inface_recognition/image_compression_in_face_recognition_-_a_literature_survey, 15 pages.
First Office Action, CN App. No. 201580022332.2, dated Aug. 5, 2019, 14 pages (7 pages of English Translation and 7 pages of Original Document).
Manabe et al., "Person Verification using Handwriting Gesture", Proceedings of the 26th Annual Conference of Japanese Society for Artifical Intelligence, 2012, 9 pages (English Abstract Submitted).
Non-Final Office Action, U.S. Appl. No. 15/229,233, dated Jan. 31, 2020, 18 pages.
Non-Final Office Action, U.S. Appl. No. 15/822,531, dated Dec. 11, 2019, 19 pages.
Notice of Allowance, U.S. Appl. No. 14/145,466, dated Feb. 12, 2020, 12 pages.
Notice of Allowance, U.S. Appl. No. 15/881,522, dated Dec. 31, 2019, 10 pages.
Notice of Allowance, U.S. Appl. No. 15/229,254, dated Jan. 15, 2020, 9 pages.
Notice of Reasons for Refusal, JP App. No. 2018-209608, dated Oct. 7, 2019, 11 pages (7 pages of English Translation and 4 pages of Original Document).
Crowley et al., "Online Identity and Consumer Trust: Assessing Online Risk", Available Online at <https://www.brookings.eduiwp-content/uploads/2016/06/0111_online_identity_trust.pdf>, Jan. 11, 2011, 15 pages.
Final Office Action, U.S. Appl. No. 15/822,531, dated Apr. 7, 2020, 22 pages.
Notice of Allowance, U.S. Appl. No. 14/218,677, dated May 8, 2020, 10 pages.
Notice of Allowance, U.S. Appl. No. 15/229,254, dated Mar. 17, 2020, 3 pages.
Notice of Allowance, U.S. Appl. No. 15/881,522, dated Apr. 20, 2020, 10 pages.

(56) References Cited

OTHER PUBLICATIONS

Communication pursuant to Article 94(3) EPC, EP App. No. 15786487.7, dated Feb. 20, 2020, 6 pages.
Decision of Final Rejection, JP App. No. 2016-566924, dated Feb. 27, 2020, 8 pages (5 pages of English Translation and 3 pages of Original Document).
First Office Action CN App. No. 201580040831.4, dated Mar. 3, 2020, 31 pages (18 pages of English Translation and 13 pages of Office Action).
Intention to Grant a Patent, EP App. No. 15826364.0, dated Feb. 18, 2020, 6 pages.
Second Office Action, CN App. No. 201580040813.6, dated Mar. 24, 2020, 19 pages (11 pages of English Translation and 8 pages of Original Document).
Intention to Grant under Rule 71(3) EPC, EP App. No. 15826660.1, dated Apr. 28, 2020, 6 pages.
Intention to Grant under Rule 71(3) EPC, EP App. No. 15828152.7, dated Apr. 1, 2020, 6 pages.

\* cited by examiner

| Rule | Location Class | Minimum Authentication Required |
|---|---|---|
| 1 | Location Class 1 | Authentication Technique(s) 1 |
| 2 | Location Class 2 | Authentication Technique(s) 2 |
| 3 | Location Class 3 | Authentication Technique(s) 3 |
| 4 | Location Class 4 | Authentication Technique(s) 4 |
| 5 | Location Class 5 | Authentication Technique(s) 5 |
| ------ | ------ | ------ |

Authentication Policy 211

FIG. 3

SYSTEM AND METHOD FOR ADAPTIVE APPLICATION OF AUTHENTICATION POLICIES

CROSS REFERENCE TO RELATED APPLICATIONS

This application claims the benefit of and priority to U.S. Provisional Patent Application No. 61/804,568, filed, Mar. 22, 2013, entitled, "Advanced Methods of Authentication And Its Applications".

BACKGROUND

Field of the Invention

This invention relates generally to the field of data processing systems. More particularly, the invention relates to a system and method for adaptive application of authentication policies.

Description of Related Art

FIG. 1 illustrates an exemplary client 120 with a biometric device 100. When operated normally, a biometric sensor 102 reads raw biometric data from the user (e.g., capture the user's fingerprint, record the user's voice, snap a photo of the user, etc) and a feature extraction module 103 extracts specified characteristics of the raw biometric data (e.g., focusing on certain regions of the fingerprint, certain facial features, etc). A matcher module 104 compares the extracted features 133 with biometric reference data 110 stored in a secure storage on the client 120 and generates a score based on the similarity between the extracted features and the biometric reference data 110. The biometric reference data 110 is typically the result of an enrollment process in which the user enrolls a fingerprint, voice sample, image or other biometric data with the device 100. An application 105 may then use the score to determine whether the authentication was successful (e.g., if the score is above a certain specified threshold).

Systems have been designed for providing secure user authentication over a network using biometric sensors. In such systems, the score generated by the application, and/or other authentication data, may be sent over a network to authenticate the user with a remote server. For example, Patent Application No. 2011/0082801 ("'801 application") describes a framework for user registration and authentication on a network which provides strong authentication (e.g., protection against identity theft and phishing), secure transactions (e.g., protection against "malware in the browser" and "man in the middle" attacks for transactions), and enrollment/management of client authentication tokens (e.g., fingerprint readers, facial recognition devices, smartcards, trusted platform modules, etc).

The assignee of the present application has developed a variety of improvements to the authentication framework described in the '801 application. Some of these improvements are described in the following set of U.S. Patent Applications ("Co-pending Applications"), all filed Dec. 29, 1012, which are assigned to the present assignee and incorporated herein by reference: Ser. No. 13/730,761, Query System and Method to Determine Authentication Capabilities; Ser. No. 13/730,776, System and Method for Efficiently Enrolling, Registering, and Authenticating With Multiple Authentication Devices; Ser. No. 13/730,780, System and Method for Processing Random Challenges Within an Authentication Framework; Ser. No. 13/730,791, System and Method for Implementing Privacy Classes Within an Authentication Framework; Ser. No. 13/730,795, System and Method for Implementing Transaction Signaling Within an Authentication Framework.

Briefly, the Co-Pending applications describe authentication techniques in which a user enrolls with biometric devices of a client to generate biometric template data (e.g., by swiping a finger, snapping a picture, recording a voice, etc); registers the biometric devices with one or more servers over a network (e.g., Websites or other relying parties equipped with secure transaction services as described in the Co-Pending applications); and subsequently authenticates with those servers using data exchanged during the registration process (e.g., encryption keys provisioned into the biometric devices). Once authenticated, the user is permitted to perform one or more online transactions with a Website or other relying party. In the framework described in the Co-Pending applications, sensitive information such as fingerprint data and other data which can be used to uniquely identify the user, may be retained locally on the user's client device (e.g., smartphone, notebook computer, etc) to protect a user's privacy.

For certain classes of transactions, the riskiness associated with the transaction may be inextricably tied to the location where the transaction is being performed. For example, it may be inadvisable to allow a transaction that appears to originate in a restricted country, such as those listed on the US Office of Foreign Asset Control List (e.g., Cuba, Libya, North Korea, etc). In other cases, it may only be desirable to allow a transaction to proceed if a stronger authentication mechanism is used; for example, a transaction undertaken from within the corporation's physical premises may require less authentication than one conducted from a Starbucks located in a remote location where the company does not have operations.

However, reliable location data may not be readily available for a variety of reasons. For example, the end user's device may not have GPS capabilities; the user may be in a location where Wifi triangulation data is unavailable or unreliable; the network provider may not support provide cell tower triangulation capabilities to augment GPS, or Wifi triangulation capabilities. Other approaches to divine the device's location may not have a sufficient level of assurance to meet the organization's needs; for example, reverse IP lookups to determine a geographic location may be insufficiently granular, or may be masked by proxies designed to mask the true network origin of the user's device.

In these cases, an organization seeking to evaluate the riskiness of a transaction may require additional data to provide them with additional assurance that an individual is located in a specific geographic area to drive authentication decisions.

Another challenge for organizations deploying authentication is to match the "strength" of the authentication mechanism to the inherent risks presented by a particular user's environment (location, device, software, operating system), the request being made by the user or device (a request for access to restricted information, or to undertake a particular operation), and the governance policies of the organization.

To date, organizations have had to rely on a fairly static response to the authentication needs of its users: the organization evaluates the risks a user will face during operations they normally perform and the requirements of any applicable regulatory mandate, and then deploys an authentication solution to defend against that risk and achieve compliance. This usually requires the organization to deploy multiple authentication solutions to address the multitude and variety of risks that their different users may face, which can be especially costly and cumbersome to manage.

The techniques described in the Co-pending applications provide an abstraction that allows the organization to identify existing capabilities on the user's device that can be used for authentication. This abstraction shields an organization from the need to deploy a variety of different authentication solutions. However, the organization still needs a way to invoke the "correct" authentication mechanism when necessary. Existing implementations provide no capabilities for the organization to describe what authentication mechanism is appropriate under which circumstances. As a result, an organization would likely need to codify their authentication policy in code, making the solution brittle and necessitating code changes in the future to enable use of new authentication devices/tokens.

BRIEF DESCRIPTION OF THE DRAWINGS

A better understanding of the present invention can be obtained from the following detailed description in conjunction with the following drawings, in which:

FIG. 3 illustrates an exemplary set of authentication policy rules;

DETAILED DESCRIPTION OF PREFERRED EMBODIMENTS

Figure 1:
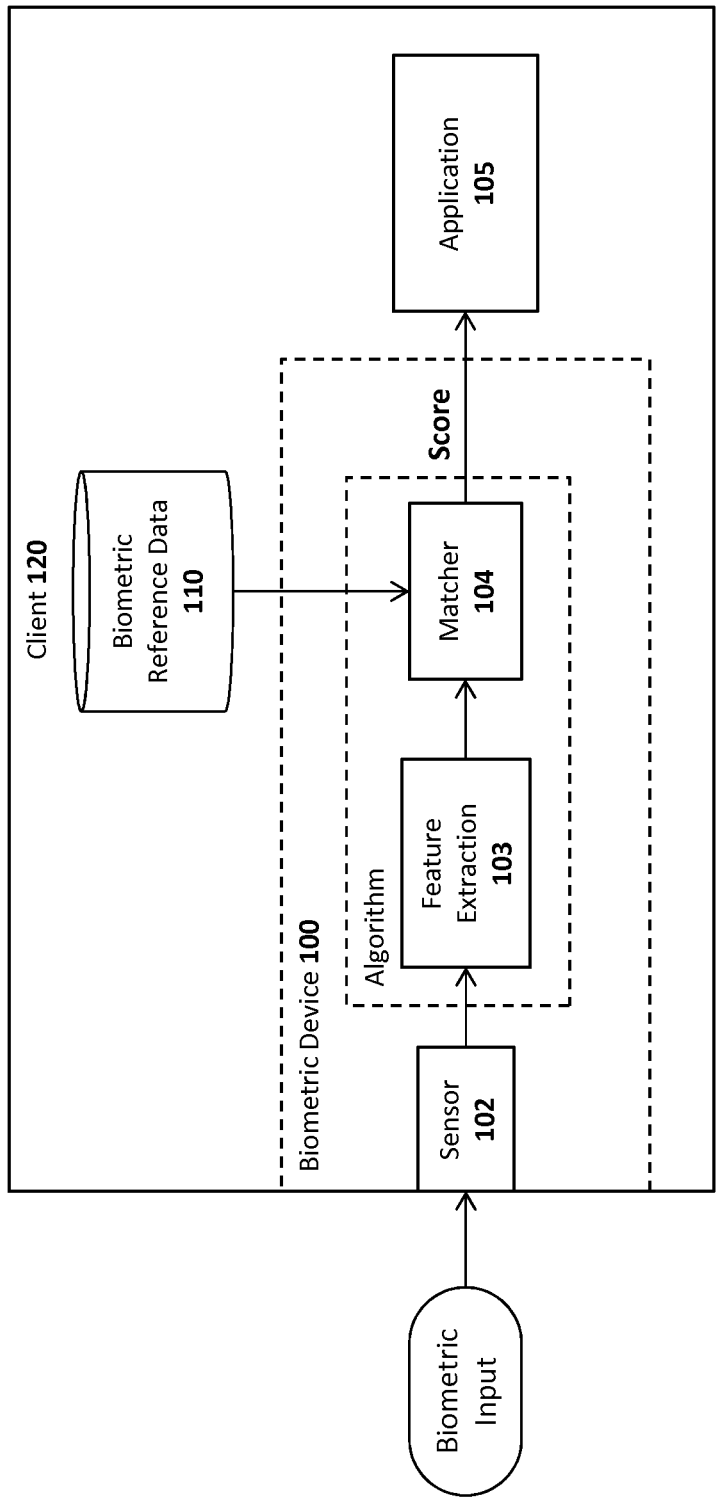
FIG. 1 illustrates an exemplary client equipped with a biometric device.

Described below are embodiments of an apparatus, method, and machine-readable medium for implementing a location-aware authentication policy. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

The embodiments of the invention discussed below involve client devices with authentication capabilities such as biometric devices or PIN entry. These devices are sometimes referred to herein as "tokens," "authentication devices," or "authenticators." Various different biometric devices may be used including, but not limited to, fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user). The authentication capabilities may also include non-biometric devices such as trusted platform modules (TPMs) smartcards, Trusted Execution Environments (TEEs), and Secure Elements (SEs)

As mentioned above, in a mobile biometric implementation, the biometric device may be remote from the relying party. As used herein, the "relying party" is the entity which utilizes the authentication techniques described herein to authenticate the end user. For example, the relying party may be an online financial service, online retail service (e.g., Amazon®), cloud service, or other type of network service with which the user is attempting to complete a transaction (e.g., transferring funds, making a purchase, accessing data, etc). In addition, as used herein, the term "remote" means that the biometric sensor is not part of the security boundary of the computer it is communicatively coupled to (e.g., it is not embedded into the same physical enclosure as the relying party computer). By way of example, the biometric device may be coupled to the relying party via a network (e.g., the Internet, a wireless network link, etc) or via a peripheral input such as a USB port. Under these conditions, there may be no way for the relying party to know if the device is one which is authorized by the relying party (e.g., one which provides an acceptable level of authentication and integrity protection) and/or whether a hacker has compromised the biometric device. Confidence in the biometric device depends on the particular implementation of the device.

Location-Aware Authentication Techniques

One embodiment of the invention implements an authentication policy that allows authentication mechanisms to be selected based on the physical location of the client device being used for authentication. For example, the client and/or server may make a determination of the physical location of the client device, and feed that location to a policy engine that evaluates an ordered set of policy rules. In one embodiment, these rules specify classes of locations and the authentication mechanism or mechanisms that must be applied if the client location matches the location definition in the rule.

Figure 2:
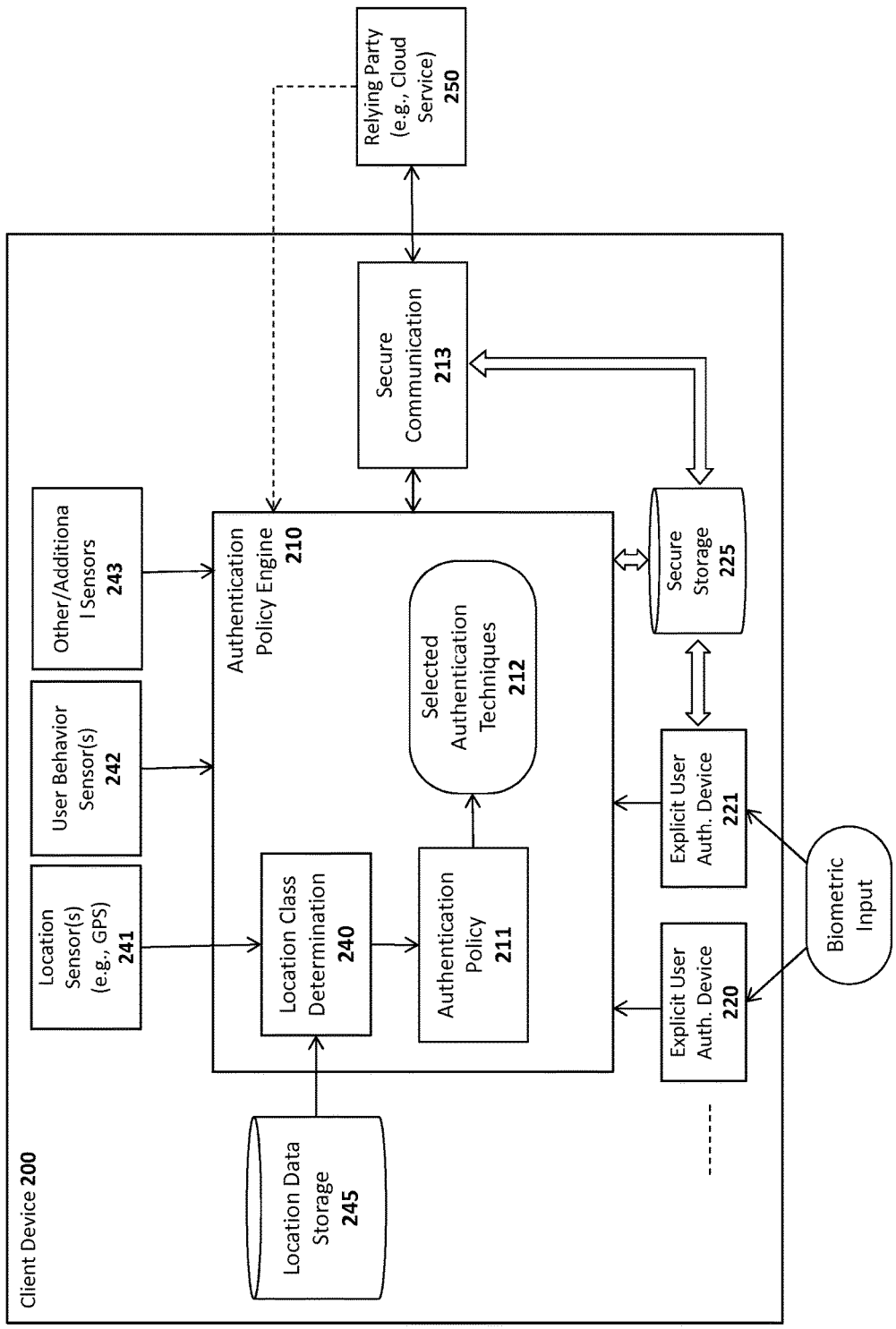
FIG. 2 illustrates one embodiment of a system for performing location-aware application of authentication policy.

As illustrated in FIG. 2, one embodiment of the invention includes a client device 200 with an authentication policy engine 210 for implementing the location-aware authentication policies described herein. In particular, this embodiment includes a location class determination module 240 for using the current location of the client device 200, provided by location sensors 241 (e.g., a GPS device), to identify a current location "class." As discussed in detail below, different location "classes" may be defined comprising known geographical points and/or regions. Location class data may be continuously updated and stored in a persistent location data storage device 245 (e.g., a flash storage or other persistent storage device). The location class determination module 240 may then compare the current location provided by the sensor(s) 241 against the defined "classes" to determine a current location class for the client device 200.

In one embodiment, the relying party 250 specifies the authentication policy to be implemented by the authentication policy engine 210 for each transaction (as indicated by the dotted line from the relying party to the authentication policy engine). Thus, the authentication policy may be uniquely tailored to the authentication requirements of each relying party. In addition, the level of authentication required may be determined based on the current transaction (as defined by the authentication policy). For example, a transaction which requires a transfer of a significant amount of money may require a relatively high authentication assurance threshold, whereas non-monetary transaction may require a relatively lower authentication assurance threshold. Thus, the location-aware authentication techniques described herein may be sufficient for certain transactions but may be combined with more rigorous authentication techniques for other transactions.

In one embodiment, the location class determination module 240 provides the determined class to an authentication policy module 211 which implements a set of rules to identify the authentication techniques 212 to be used for the determined class. By way of example, and not limitation, FIG. 3 illustrates an exemplary set of rules 1-5 specifying one or more authentication techniques 1-5 which may be used for each defined location class 1-5. Although illustrated as a table data structure in FIG. 3, the underlying principles of the invention are not limited to any particular type of data structure for implementing the rule set.

Once the authentication policy engine 210 selects a set of authentication techniques 212, the authentication policy engine 210 may implement the techniques using one or more explicit user authentication devices 220-221 and/or non-intrusive authentication techniques 242-243 to authenticate the user with a relying party 250. By way of example, and not limitation, the explicit user authentication 220-221 may include requiring the user to enter a secret code such as a PIN, fingerprint authentication, voice or facial recognition, and retinal scanning, to name a few.

The non-intrusive authentication techniques 242-243 may include user behavior sensors 242 which collect data related to user behavior for authenticating the user. For example, the biometric gait of the user may be measured using an accelerometer or other type of sensor 242 in combination with software and/or hardware designed to generate a gait "fingerprint" of the user's normal walking pattern. As discussed below, other sensors 243 may be used to collect data used for authentication. For example, network data may be collected identifying network/computing devices within the local proximity of the client device 200 (e.g., known peer computers, access points, cell towers, etc).

In one embodiment, secure storage 225 is a secure storage device used to store authentication keys associated with each of the authentication devices 220-221. As discussed below, the authentication keys may be used to establish secure communication channels with the relying party 250 via a secure communication module 213.

Various different "classes" of locations may be defined consistent with the underlying principles of the invention. By way of example, and not limitation, the following classes of locations may be defined:

Class 1: The client is within a given radius of a specified location. In this class, the associated authentication policy is applied if the current client location is within an area bounded by a circle of a given radius, centered at a specified latitude and longitude.

Class 2: The client is within a specified boundary region. In this class, the associated authentication policy is applied if the client is located within an area bounded by a polygon defined by an ordered set of latitude and longitude pairs (e.g., a closed polygon).

Class 3: The client is outside a specified boundary. In this class, the associated authentication policy is applied if the client is located outside an area bounded by a polygon defined by an ordered set of latitude and longitude pairs (e.g., a closed polygon).

In one embodiment, additional classes are defined using Boolean combinations of the classes and policy rules defined above. For example, the Boolean operations AND, OR, NOT, and the nesting of Boolean operations allow the expression of complex conditions. Such policies could be used, for example, to implement a policy that applies when the client is located in one of a variety of facilities owned by a company.

Various different mechanisms may be used to determine the current physical location of the client (represented generally in FIG. 2 as location sensors 241), including, but not limited to the following:

GPS: Embedded GPS sensors can directly provide details on the location of the client. New emerging standards seek to add authentication of the location provided as a capability that address this shortcoming in current GPS solutions.

Geo-IP Lookup: Reverse lookups of the client's IP address can be used to determine a coarse approximation of the client's location. However, the trustworthiness of the location obtained through this method requires the IP address to be cross-checked against blacklists of known compromised hosts, anonymizing proxy providers, or similar solutions designed to obfuscate the source IP address of the host.

Cell Tower Triangulation: Integration between the client, the server, and wireless carrier infrastructure could allow the client and server to perform high resolution determination of physical location using cellular signal strength triangulation.

Wi-Fi Access Point Triangulation: A higher resolution method to determine physical location is to triangulate the signal strength of nearby Wifi access points with known physical locations. This method is particularly effective in determining the location of a device within facilities.

Location Displacement Inference: A device's exact location may be unknown, but a statistical probability of location may be used as an approximation for the purpose of evaluating policy. This may be calculated by noting the change in the device's position relative to a starting point with a known location; the user's device may have, in the past, had a known starting point, and in the interim has moved a known or estimate distance and bearing, allowing an approximate location to be calculated. Possible methods to calculate the displacement from the starting point may include inferring distance travelled using measurements gathered from an accelerometer (i.e. using the accelerometer to measure how far the user walked based on gait measurement), changes in signal strength from a known, stationary set of signal sources, and other methods.

Figure 4:
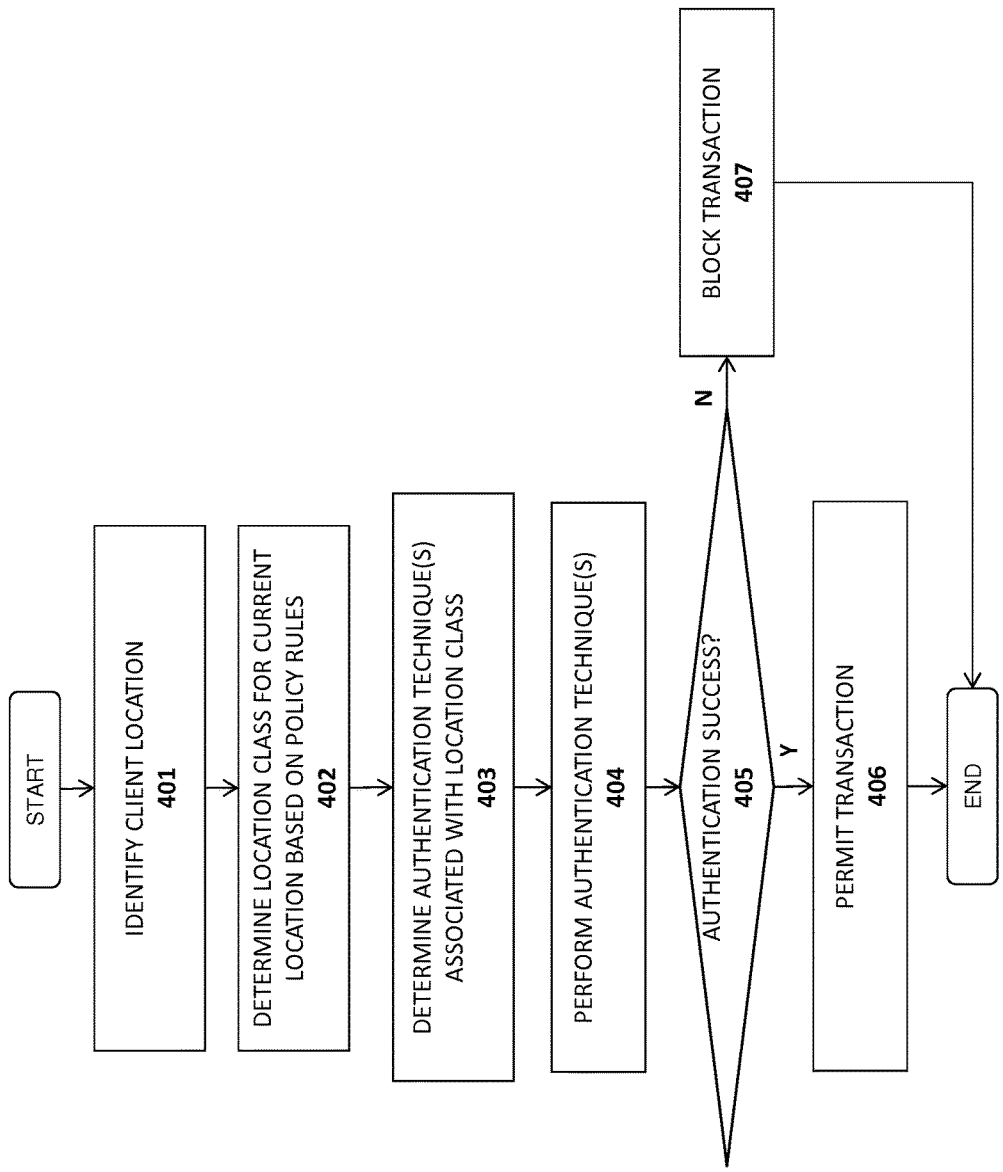
FIG. 4 illustrates a method in accordance with one embodiment of the invention.

FIG. 4 illustrates one embodiment of a method for implementing a location-aware authentication policy. The method may be executed within the context of the system architecture shown in FIGS. 2-3 but is not limited to any particular system architecture.

At 401 the client's location is identified using one or more available techniques (e.g., GPS, triangulation, peer/network device detection, etc). At 402, one or more location classes (and potentially Boolean combinations of classes) are identified for the current location based on an existing set of policy rules. At 403, one or more authentication techniques are identified according to the location class(es). For example, if the client device is currently at a location known to be the user's home or office or within a defined radius of another trusted location, then minimal (or no) authentication may be required. By contrast, if the client device is currently at an unknown location and/or a location known to be untrusted, then more rigorous authentication may be required (e.g., biometric authentication such as a fingerprint scan, PIN entry, etc). At 404, the authentication techniques are employed and if authentication is successful, determined at 405, then the transaction requiring authentication is authorized at 406.

As mentioned above, the level of authentication required may be determined based on the current transaction. For example, a transaction which requires a transfer of a significant amount of money may require a relatively high authentication assurance threshold, whereas non-monetary transaction may require a relatively lower authentication assurance threshold. Thus, the location-aware authentication techniques described herein may be sufficient for certain transactions but may be combined with more rigorous authentication techniques for other transactions.

If authentication is not successful, then the transaction is blocked at 407. At this stage, the transaction may be permanently blocked or additional authentication steps may be requested. For example, if the user entered an incorrect PIN, the user may be asked to re-enter the PIN and/or perform biometric authentication.

The embodiments of the invention described herein provide numerous benefits to authentication systems. For example, the described embodiments may be used to efficiently block access from unauthorized locations, reducing unauthorized access by limiting the location from which users are permitted to attempt authentication (e.g., as defined by location classes). In addition, the embodiments of the invention may selectively require stronger authentication to respond to location-specific risks. For example, the relying party can minimize the inconvenience of authentication when a user is entering into a transaction from a known location, while retaining the ability to require stronger authentication when the user/client is connecting from an unknown or unexpected location. Moreover, the embodiments of the invention enable location-aware access to information. Alternatively, a location-centric policy may be used by a relying party to provide a user with additional access to location-specific information. By way of example, and not limitation, a user located in a Walmart may be granted access to special offers from Amazon.com when the user logs into their Amazon.com account on their mobile phone.

As mentioned above, the location of the client device 200 may be determined using a variety of different techniques. In one particular embodiment, the definition of a "location" may not be tied to a set of physical coordinates (as with GPS), but instead be prescribed by the presence of a set of peer devices or other types of network devices. For example, when at work, the client's wireless network adapters (e.g., Wifi adapter, Bluetooth adapter, LTE adapter, etc) may "see" a set of peer network devices (e.g., other computers, mobile phones, tablets, etc) and network infrastructure devices (e.g., Wifi access points, cell towers, etc) on a consistent basis. Thus, the presence of these devices may be used for authentication when the user is at work. Other locations may be defined by the presence of devices in a similar manner such as when the user is at home.

For example, using the techniques described herein, a location may be defined as "with my work colleagues" or "at work" where the presence of a set of peer devices known to be owned by the user's work colleagues may be used as a proxy for the risk that needs to be mitigated by authentication policy. For example, if a user is surrounded by a set of known peer devices or other types of network devices, then the user may be deemed to be less of a risk than if no known devices are detected.

Figure 5:
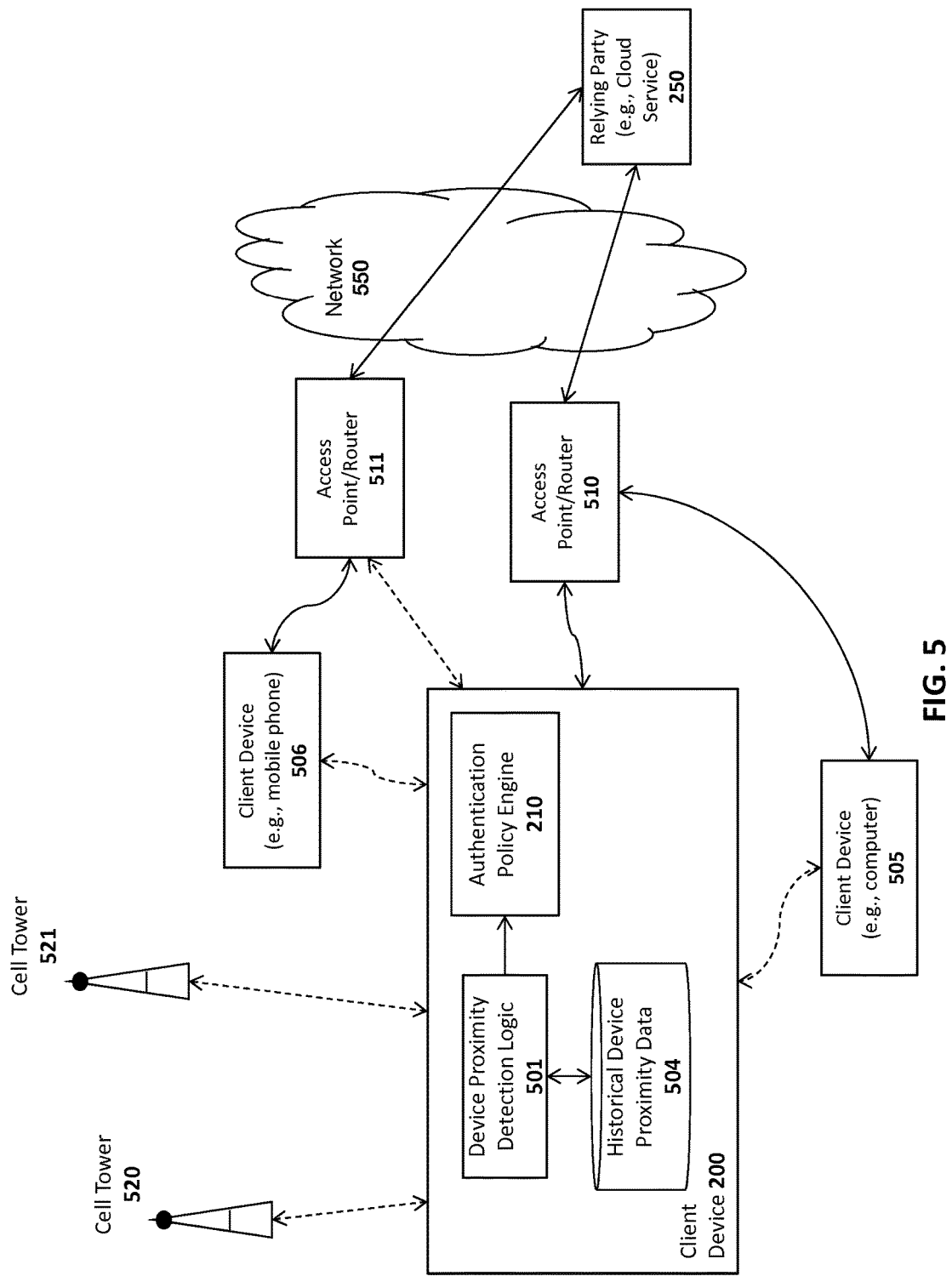
FIG. 5 illustrates one embodiment of the invention in which location is determined or confirmed by proximity of other peer or network devices.

FIG. 5 illustrates one embodiment in which a "location" is defined by a set of peer devices and other network devices. In the illustrated example, the client device 200 "sees" two different peer devices 505-506 (e.g., client computers, mobile phones, tablets, etc); two different wireless access points 510-511; and two different cell towers 520-521. As used herein, the client device 200 may "see" without formally establishing a connection with each of the other devices. For example, the client may see a variety of peer devices connected to the work LAN and/or may see the wireless signals generated by those devices regardless of whether the client connects to those devices. Similarly, the client device 200 may see the basic service set identification (BSSID) for a variety of different Wifi access points (e.g., Wifi from nearby hotels, coffee shops, work Wifi access points). The client device 200 may also see a variety of different cell towers 520-521, potentially even those operated by different cell carriers. The presence of these devices may be used to define a location "fingerprint" for the user's work location.

As illustrated, device proximity detection logic 501 on the client device 200 may capture data related to visible devices and compare the results against historical device proximity data 504. The historical device proximity data 504 may be generated over time and/or through a training process. For example, in one embodiment, the user may specify when he/she is at work, at home, or at other locations (either manually, or when prompted to do so by the client 200). In response, the device proximity detection logic 501 may detect the devices in the vicinity and persistently store the results as historical device proximity data 504. When the user subsequently returns to the location, the device proximity detection logic 501 may compare the devices that it currently "sees" against the devices stored as historical proximity data 504 to generate a correlation between the two. In general, the stronger the correlation, the more likely it is that the client is at the specified location. Over time, devices which are seen regularly may be prioritized above other devices in the historical device proximity data 504 (e.g., because these devices tend to provide a more accurate correlation with the user's work location).

In one embodiment, the authentication policy engine 210 may use the correlation results provided by the device proximity detection logic 501 to determine the level of authentication required by the user for each relying party 250. For example, if a high correlation exists (i.e., above a specified threshold), then the authentication policy engine may not require explicit authentication by the end user. By contrast, if there is a low correlation between the user's current location and the historical device proximity data 504 (i.e., below a specified threshold), then the authentication policy engine 210 may require more rigorous authentication (e.g., a biometric authentication such as a fingerprint scan and/or requesting PIN entry).

In one embodiment, the device proximity detection logic 501 identifies the set of other devices that are in the client's proximity which have been authenticated. For example, if several of a user's colleagues have already authenticated successfully, then there may be less risk associated with allowing the user to access certain data with a less reliable authenticator, simply because the user is operating in the presence of his/her peers. In this embodiment, peer-to-peer communication over standards such as 802.11n may be used to collect authentication tokens from peers that can be used to prove those peers have already authenticated.

In another embodiment, the device proximity detection logic 501 may also detect a previously authenticated device that is paired with the user's client (e.g., such as the user's mobile phone or tablet). The presence of another authenticated device that is used by the same user that is attempting to authenticate may be used as an input to the authentication decision, particularly when accessing the same application.

In one embodiment, the historical device proximity data 504 is collected and shared across multiple devices, and may be stored and maintained on an intermediate authentication service. For example, a history of groups of peers and network devices in each location may be tracked and stored in a central database accessible to the device proximity detection logic 501 on each device. This database may then be used as an input to determine the risk of an attempted authentication from a particular location.

Embodiments for Confirming Location Using Supplemental Sensor and/or Location Data As mentioned above, one embodiment of the invention leverages data from additional sensors 243 from the mobile device to provide supplemental inputs to the risk calculation used for authentication. These supplemental inputs may provide additional levels of assurance that can help to either confirm or refute claims of the location of the end user's device.

Figure 6:
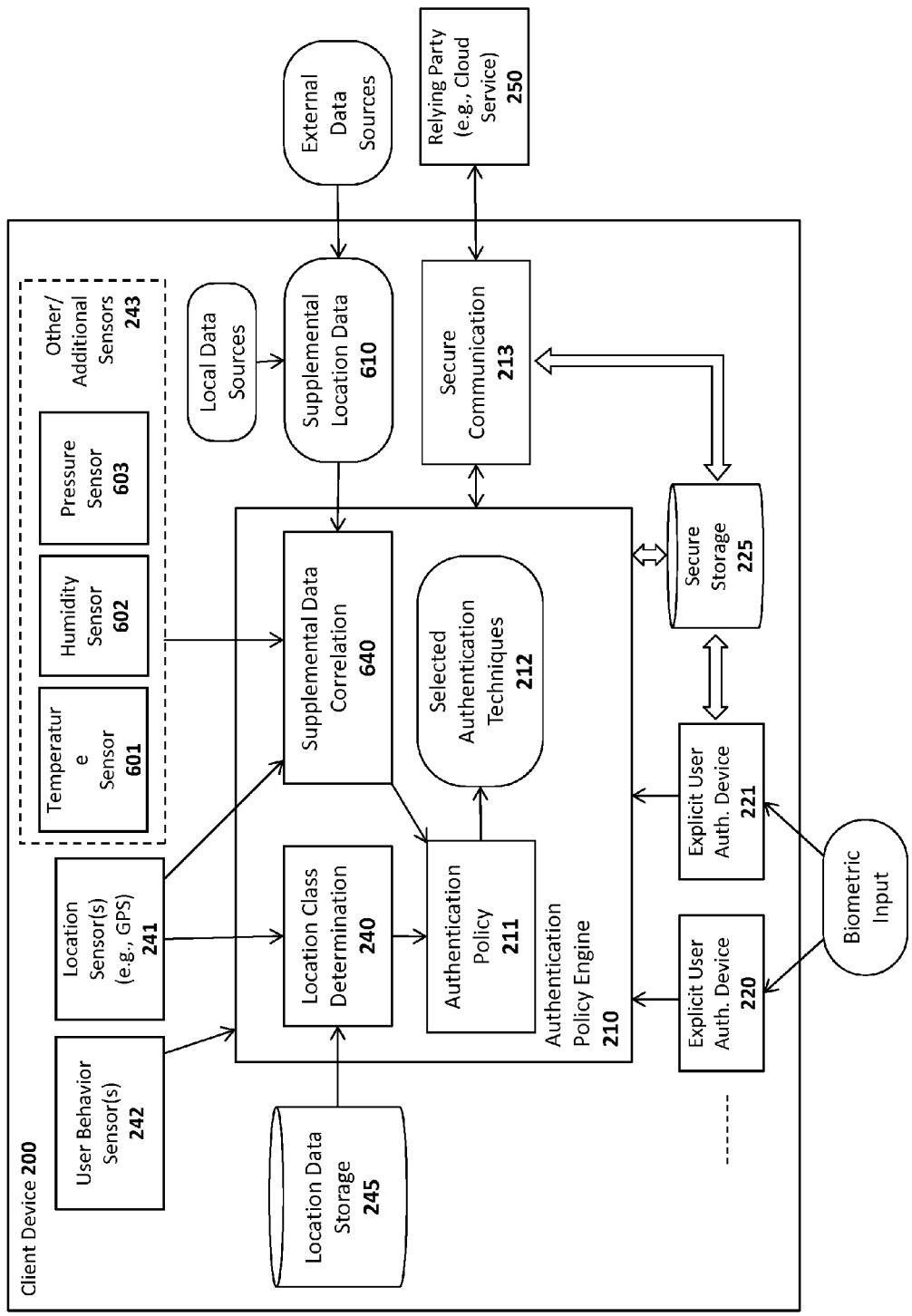
FIG. 6 illustrates one embodiment of a system for authentication which uses environmental sensors.

As illustrated in FIG. 6 the additional sensors 243 which provide supplemental assurance of the device's location may include temperature sensors 601, humidity sensors 602 and pressure sensors 603 (e.g., barometric or altimeter pressure sensors). In one embodiment, the sensors provide temperature, humidity, and pressure readings, respectively, which are used by a supplemental data correlation module 640 of the authentication policy engine 210 to correlate against supplemental data 610 known about the location provided by the location sensor(s) 241 (or the location derived using the various other techniques described herein). The results of the correlation are then used by the authentication policy module 211 to select one or more authentication techniques 212 for a given transaction. As indicated in FIG. 6, the supplemental location data 610 may include data collected from external sources (e.g., the Internet or other mobile devices) and local data sources (e.g., historical data collected during periods when the device is known to be in possession of the legitimate user).

The supplemental data correlation module 640 may use the data provided by the additional sensors 243 in a variety of different ways to correlate against the supplemental location data 610. For example, in one embodiment, the supplemental location data 610 includes current local meteorological conditions at the location provided by the location sensor(s) 241. By comparing the humidity, temperature, or barometric pressure gathered from the additional sensors 243 against real-time local weather data 610, the supplemental data correlation module 640 identifies cases where the sensor data is inconsistent with local conditions. For example, if the client device's GPS reading indicates that the device is outside, yet the temperature, humidity, or barometric pressure are not consistent with the local weather conditions, then the supplemental data correlation module 640 may generate a low correlation score and the location may be deemed less trustworthy. Consequently, the authentication policy module 211 may require more rigorous authentication techniques 212 (e.g., fingerprint, PIN entry, etc) to approve a transaction.

As another example, by comparing the altitude provided by an altimeter pressure sensor 603 against the known geographical or network topology of the claimed location (provided with the supplemental location data 610), the supplemental data correlation module 640 may identify discrepancies that signal the claimed location is not genuine. For example, if a reverse IP lookup of the user's claimed location identifies them as being in the Andes Mountains, but altimeter data from the device indicates the device is at sea level, then the supplemental data correlation module 640 may generate a low correlation score and the location may be deemed less trustworthy. As a result of the low correlation score, the authentication policy module 211 may attempt to mitigate the higher risk with stronger authentication for the transaction.

In one embodiment, the supplemental data correlation module 640 compares data gathered from sensors 243 on the user's device against multiple other end users in the immediate area to identify anomalies that suggest the user is not operating in the same physical location as those known users. For example, if a set of authenticated users are identified who are operating the same physical area, and all of those users' devices note that the local temperature in the area is 10° C., the supplemental data correlation module 640 may generate a low correlation score for an end user whose temperature sensor 601 indicates the local temperature is 20° C. As a result, the authentication policy 211 may require more rigorous authentication techniques 212.

As yet another example, the supplemental data correlation module 640 may compare current readings against historical data for a particular user. For example, as mentioned, sensor data may be analyzed during periods of time when the user is known to be in possession of the device 200 (e.g., for a time period following an explicit authentication). The supplemental data correlation module 640 may then look for discontinuities in the local data to identify suspicious behavior. For example, if the user's ambient temperature normally floats between 10° C. and 20° C. and it is currently at 30° C., this may indicate the user is not in a typical location, thereby generating a low correlation and causing the authentication policy module 211 to require an additional level of scrutiny for a transaction.

The supplemental data correlation module 640 may perform various different types of correlations between sensor data and supplemental location data while still complying with the underlying principles of the invention. For example, various known correlation mechanisms may be used to determine the statistical relationship between the two sets of data. In one embodiment, the correlation score provided to the authentication policy engine 211 comprises a normalized value (e.g., between 0-1) indicating a level of correlation. In one embodiment, various threshold levels may be set for detected differences between the sensors 243 and supplemental location data 610. For example, if the temperature sensor 601 measures a temperature of more than 3 degrees off of the current temperature (gathered from other devices or the Internet), then a first threshold may be triggered (resulting in a lowering of the correlation score). Each additional 3 degrees off from the current temperature may then result in a new threshold being met (resulting in a corresponding lowering of the correlation score). It should be noted, however, that these are merely examples of one embodiment of the invention; the underlying principles of the invention are not limited to any particular manner of performing a correlation.

Figure 7:
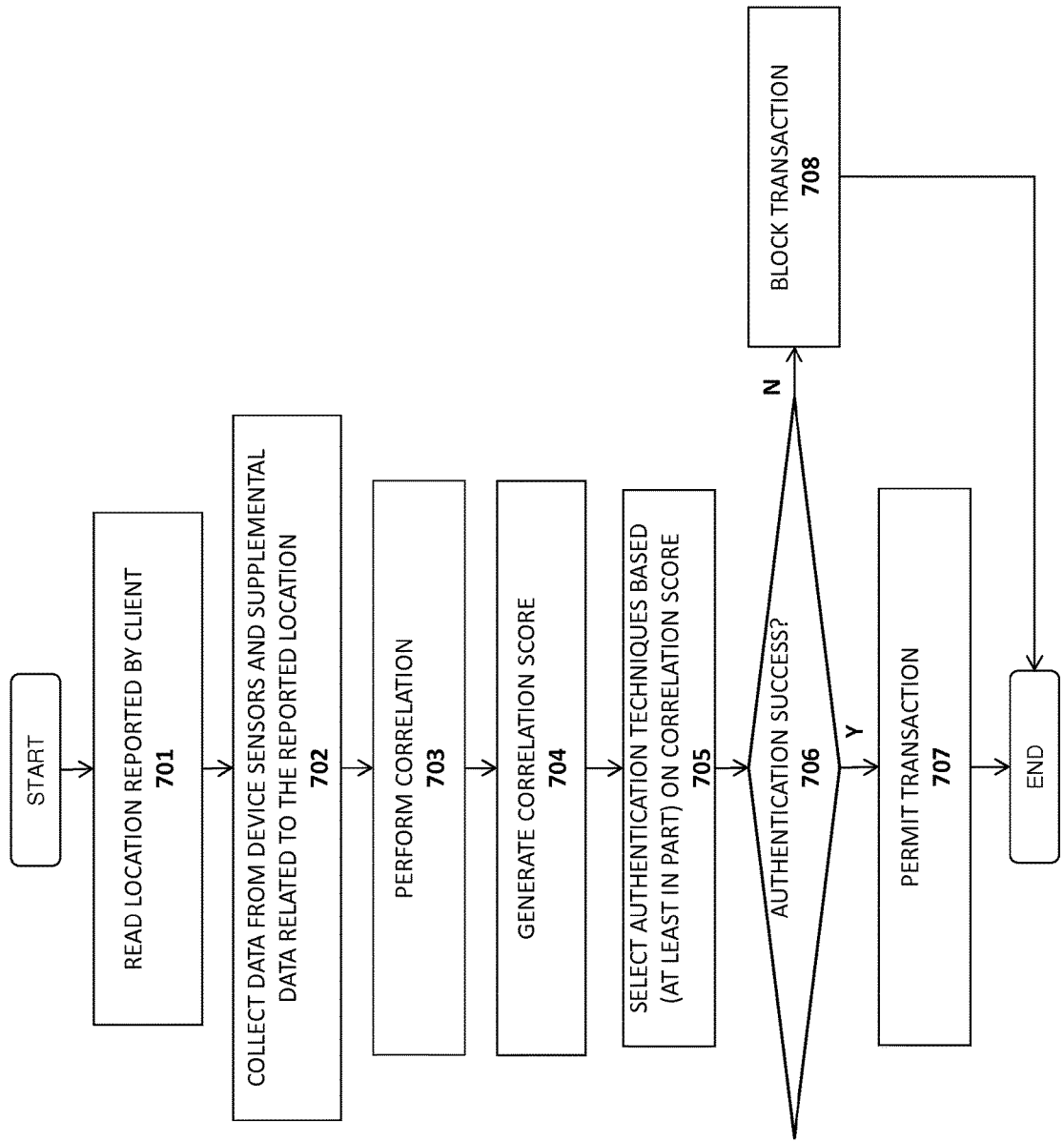
FIG. 7 illustrates one embodiment of a method for authentication which uses environmental sensors.

A method in accordance with one embodiment of the invention is illustrated in FIG. 7. At 701, the current location being reported by the client device (e.g., via the GPS module on the device) is read. At 702, supplemental location data is collected for the reported location along with sensor data from the client device. As mentioned above, the supplemental location data may be collected locally or remotely (e.g., from other clients and/or servers on the Internet) and may include data such as the current temperature, pressure and/or humidity for the reported location. The sensor data may be provided by temperature sensors, barometric or altimeter pressure sensors, and/or humidity sensors.

At 703, a correlation is performed between the supplemental location data and the sensor data provided by the device sensors. In one embodiment, a relatively higher correlation will result in a relatively higher correlation score at 704 whereas lower correlations will result in relatively lower correlation scores. As mentioned, in one embodiment, the correlation score is a normalized value (e.g., between 0-1) indicating the similarity between the sensor readings and supplemental data.

At 705 one or more authentication techniques are selected based (at least in part) on the correlation score. For example, if a relatively low correlation score is provided, then more rigorous authentication techniques may be selected whereas if a relatively high correlation exists then less rigorous authentication techniques may be selected (potentially those which do not require explicit authentication by the end user).

If the user successfully authenticates using the selected techniques, determined at 706, then the transaction is allowed to proceed at 707. If not, then the transaction is blocked at 708.

Numerous benefits are realized from the above embodiments. For example, these embodiments provide an additional level of assurance for location data gather from other sources: Allows the organization to supplement location data gathered from other sources (IP, GPS, etc) in order to gain additional assurance that the location is authentic. In addition, the embodiments of the invention may block a transaction from an unauthorized location, reducing unauthorized access by limiting the location from which users can even attempt authentication. Moreover, these embodiments may force stronger authentication to respond to location-specific risks (e.g., the relying party can minimize the inconvenience of authentication when the user is accessing information from a known location, while retaining the ability to require stronger authentication when the user/client is accessing from an unknown or unexpected location, or a location whose veracity can't be sufficiently qualified using multiple inputs).

Figure 8:
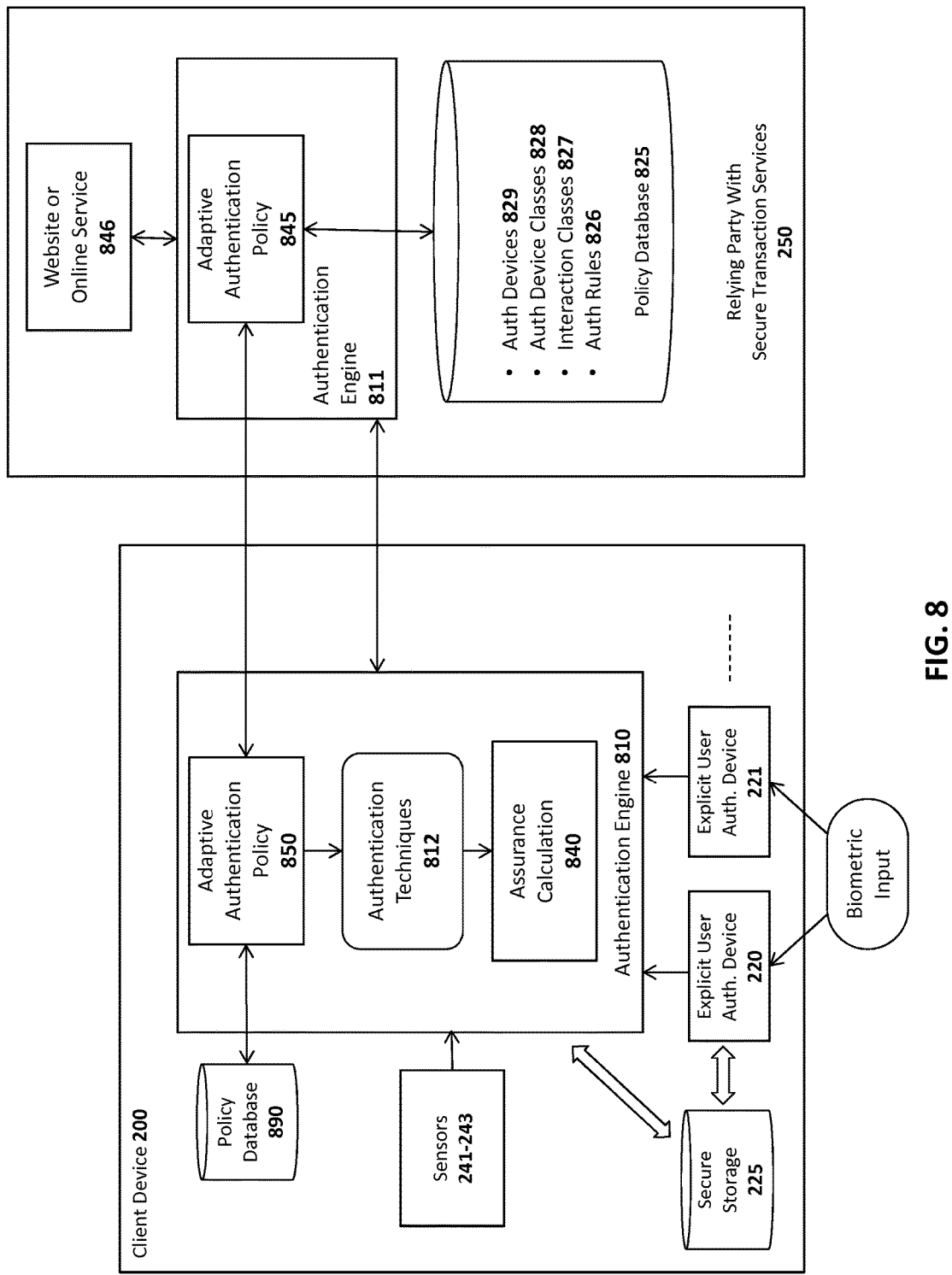
FIG. 8 illustrates one embodiment of a system for adaptively applying an authentication policy.

Adaptive Application of Authentication Policy Based on Client Authentication Capabilities As illustrated in FIG. 8, one embodiment of the invention includes an adaptive authentication policy engine 845 that allows an organization—e.g., a relying party with secure transaction services 250 (hereinafter simply referred to as the "relying party")—to specify which types of authentication are appropriate for a particular class of interactions. As illustrated, the adaptive authentication policy engine 845 may be implemented as a module within the authentication engine 811 executed at the relying party 250. In this embodiment, the adaptive authentication policy engine 845 executes in accordance with a policy database 825 containing data for existing authentication devices 829, authentication device classes 828, interaction classes 827, and authentication rules 826.

In one embodiment, the authentication device data 829 comprises data associated with each of the explicit user authentication devices 220-221 known to be used with clients 200. For example, the policy database 825 may include an entry for a "Validity Model 123" fingerprint sensor along with technical details related to this sensor such as the manner in which the sensor stores sensitive data (e.g., in cryptographically secure hardware, EAL 3 certification, etc) and the false acceptance rate (indicating how reliable the sensor is when generating a user authentication result).

In one embodiment, the authentication device classes 828 specify logical groupings of authentication devices 829 based on the capabilities of those devices. For example, one particular authentication device class 828 may be defined for (1) fingerprint sensors (2) that store sensitive data in cryptographically secure hardware that has been EAL 3 certified, and (3) that use a biometric matching process with a false acceptance rate less than 1 in 1000. Another device class 828 may be (1) facial recognition devices (2) which do not store sensitive data in cryptographically secure hardware, and (3) that use a biometric matching process with a false acceptance rate less than 1 in 500. Thus, a fingerprint sensor or facial recognition implementation which meets the above criteria will be added to the appropriate authentication device class(es) 828.

Various individual attributes may be used to define authentication device classes, such as the type of authentication factor (fingerprint, PIN, face, for example), the level of security assurance of the hardware, the location of storage of secrets, the location where cryptographic operations are performed by the authenticator (e.g., in a secure chip or Secure Enclosure), and a variety of other attributes. Another set of attributes which may be used are related to the location on the client where the "matching" operations are performed. For example, a fingerprint sensor may implement the capture and storage of fingerprint templates in a secure storage on the fingerprint sensor itself, and perform all validation against those templates within the fingerprint sensor hardware itself, resulting in a highly secure environment. Alternatively, the fingerprint sensor may simply be a peripheral that captures images of a fingerprint, but uses software on the main CPU to perform all capture, storage, and comparison operations, resulting in a less secure environment. Various other attributes associated with the "matching" implementation may also be used to define the authentication device classes (e.g., whether the matching is (or is not) performed in a secure element, trusted execution environment (TEE)), or other form of secure execution environment).

Of course, these are merely examples for illustrating the concept of authentication device classes. Various additional authentication device classes may be specified while still complying with the underlying principles. Moreover, it should be noted that, depending on how the authentication device classes are defined, a single authentication device may be categorized into multiple device classes.

In one embodiment, the policy database 825 may be updated periodically to include data for new authentication devices 829 as they come to market as well as new authentication device classes 828, potentially containing new classes into which the new authentication devices 829 may be classified. The updates may be performed by the relying party and/or by a third party responsible for providing the updates for the relying party (e.g., a third party who sells the secure transaction server platforms used by the relying party).

In one embodiment, interaction classes 827 are defined based on the particular transactions offered by the relying party 825. For example, if the relying party is a financial institution, then interactions may be categorized according to the monetary value of the transaction. A "high value interaction" may be defined as one in which an amount of $5000 or more is involved (e.g., transferred, withdrawn, etc); a "medium value interaction" may be defined as one in which an amount between $500 and $4999 is involved; and a "low value transaction" may be defined as one in which an amount of $499 or less is involved.

In addition to the amount of money involved, interaction classes may be defined based on the sensitivity of the data involved. For example, transactions disclosing a user's confidential or otherwise private data may be classified as "confidential disclosure interactions" whereas those which do not disclose such data may be defined as "non-confidential disclosure interactions." Various other types of interactions may be defined using different variables and a variety of minimum, maximum, and intermediate levels.

Finally, a set of authentication rules 826 may be defined which involve the authentication devices 829, authentication device classes 827, and/or interaction classes 827. By way of example, and not limitation, a particular authentication rule may specify that for "high value transactions" (as specified by an interaction class 827) only fingerprint sensors that store sensitive data in cryptographically secure hardware that has been EAL 3 certified, and that use a biometric matching process with a false acceptance rate less than 1 in 1000 (as specified as an authentication device class 828) may be used. If a fingerprint device is not available, the authentication rule may define other authentication parameters that are acceptable. For example, the user may be required to enter a PIN or password and also to answer a series of personal questions (e.g., previously provided by the user to the relying party). Any of the above individual attributes specified for authentication devices and/or authentication device classes may be used to define the rules, such as the type of authentication factor (fingerprint, PIN, face, for example), the level of security assurance of the hardware, the location of storage of secrets, the location where cryptographic operations are performed by the authenticator.

Alternatively, or in addition, a rule may specify that certain attributes can take on any value, as long as the other values are sufficient. For example, the relying party may specify that a fingerprint device must be used which stores its seed in hardware and performs computations in hardware, but does not care about the assurance level of the hardware (as defined by an authentication device class 828 containing a list of authentication devices meeting these parameters).

Moreover, in one embodiment, a rule may simply specify that only specific authentication devices 829 can be used for authenticating a particular type of interaction. For example, the organization can specify that only a "Validity Model 123 fingerprint sensor" is acceptable.

In addition, a rule or set of rules may be used to create ordered, ranked combinations of authentication policies for an interaction. For example, the rules may specify combinations of policies for individual authentication policies, allowing the creation of rich policies that accurate reflect the authentication preferences of the relying party. This would allow, for example, the relying party to specify that fingerprint sensors are preferred, but if none is available, then either trusted platform module (TPM)-based authentication or face recognition are equally preferable as the next best alternatives (e.g., in a prioritized order).

In one embodiment, the adaptive authentication policy engine 845 implements the authentication rules 826, relying on the interaction classes 827, authentication device classes 828, and/or authentication device data 829, when determining whether to permit a transaction with the client 200. For example, in response to the user of the client device 200 attempting to enter into a transaction with the relying party website or other online service 846, the adaptive authentication policy engine 845 may identify a set of one or more interaction classes 827 and associated authentication rules 826 which are applicable. It may then apply these rules via communication with an adaptive authentication policy module 850 on the client device 200 (illustrated in FIG. 8 as a component within the client's authentication engine 810). The adaptive authentication policy module 850 may then identify a set of one or more authentication techniques 812 to comply with the specified authentication policy. For example, if a prioritized set of authentication techniques are specified by the adaptive authentication policy engine 845 of the relying party, then the adaptive authentication policy module 850 may select the highest priority authentication technique which is available on the client 200.

The results of the authentication techniques 812 are provided to an assurance calculation module 840 which generates an assurance level that the current user is the legitimate user. In one embodiment, if the assurance level is sufficiently high, then the client will communicate the results of the successful authentication to the authentication engine 811 of the relying party, which will then permit the transaction.

In one embodiment, data from the client device sensors 241-243 may also be used by the assurance calculation module 840 to generate the assurance level. For example, the location sensor (e.g., a GPS device) may indicate a current location for the client device 200. If the client device is in an expected location (e.g., home or work), then the assurance calculation module 840 may use this information to increase the assurance level. By contrast, if the client device 200 is in an unexpected location (e.g., a foreign country not previously visited by the user), then the assurance calculation module 840 may use this information to lower the assurance level (thereby requiring more rigorous explicit user authentication to reach an acceptable assurance level). As discussed above, various additional sensor data such as temperature, humidity, accelerometer data, etc, may be integrated into the assurance level calculation.

The system illustrated in FIG. 8 may operate differently based on specificity with which the client authentication capabilities and other information are communicated to the relying party. For example, in one embodiment, the specific models of each of the explicit user authentication devices 220-221 and specific details of the security hardware/software and sensors 241-243 on the client device 200 may be communicated to the relying party 250. As such, in this embodiment, the adaptive authentication policy engine 845 may specifically identify the desired mode(s) of authentication, based on the authentication rules implemented for the current transaction and the risk associated with the client. For example, the adaptive authentication policy module 845 may request authentication via the "Validity Model 123" fingerprint sensor installed on the client for a given transaction.

In another embodiment, only a generic description of the authentication capabilities of the client device 200 may be provided to protect the user's privacy. For example, the client device may communicate that it has a fingerprint sensor that stores sensitive data in a cryptographically secure hardware that has been EAL 3 certified and/or that uses a biometric matching process with a false acceptance rate less than 1 in N. It may specify similar generic information related to the capabilities and specifications of other authentication devices, without disclosing the specific models of those devices. The adaptive authentication policy engine 845 may then use this general information to categorize the authentication devices in applicable authentication device classes 838 within the database 825. In response to a request to perform a transaction, the adaptive authentication policy module 845 may then instruct the client device 200 to use a particular authentication device if its class is sufficient to complete the transaction.

In yet another embodiment, the client device 200 does not communicate any data related to its authentication capabilities to the relying party. Rather, in this embodiment, the adaptive authentication policy module 845 communicates the level of authentication required and the adaptive authentication policy module 850 on the client selects one or more authentication techniques which meet that level of authentication. For example, the adaptive authentication policy module 845 may communicate that the current transaction is classified as a "high value transaction" (as specified by an interaction class 827) for which only certain classes of authentication devices may be used. As mentioned, it may also communicate the authentication classes in a prioritized manner. Based on this information, the adaptive authentication policy module 850 on the client may then select one or more authentication techniques 812 required for the current transaction.

As indicated in FIG. 8, the client device 200 may include its own policy database(s) 890 to store/cache policy data for each relying party. The policy database 890 may comprise a subset of the data stored within the policy database 825 of the relying party. In one embodiment, a different set of policy data is stored in the database 890 for each relying party (reflecting the different authentication policies of each relying party). In these embodiments, the mere indication of a particular category of transaction (e.g., a "high value transaction," "low value transaction", etc) may be sufficient information for the adaptive authentication policy module 850 on the client device 200 to select the necessary authentication techniques 812 (i.e., because the rules associated with the various transaction types are available within the local policy database 890). As such, the adaptive authentication policy module 845 may simply indicate the interaction class of the current transaction, which the adaptive authentication policy module 850 uses to identify the authentication techniques 812 based on the rules associated with that interaction class.

Figure 9:
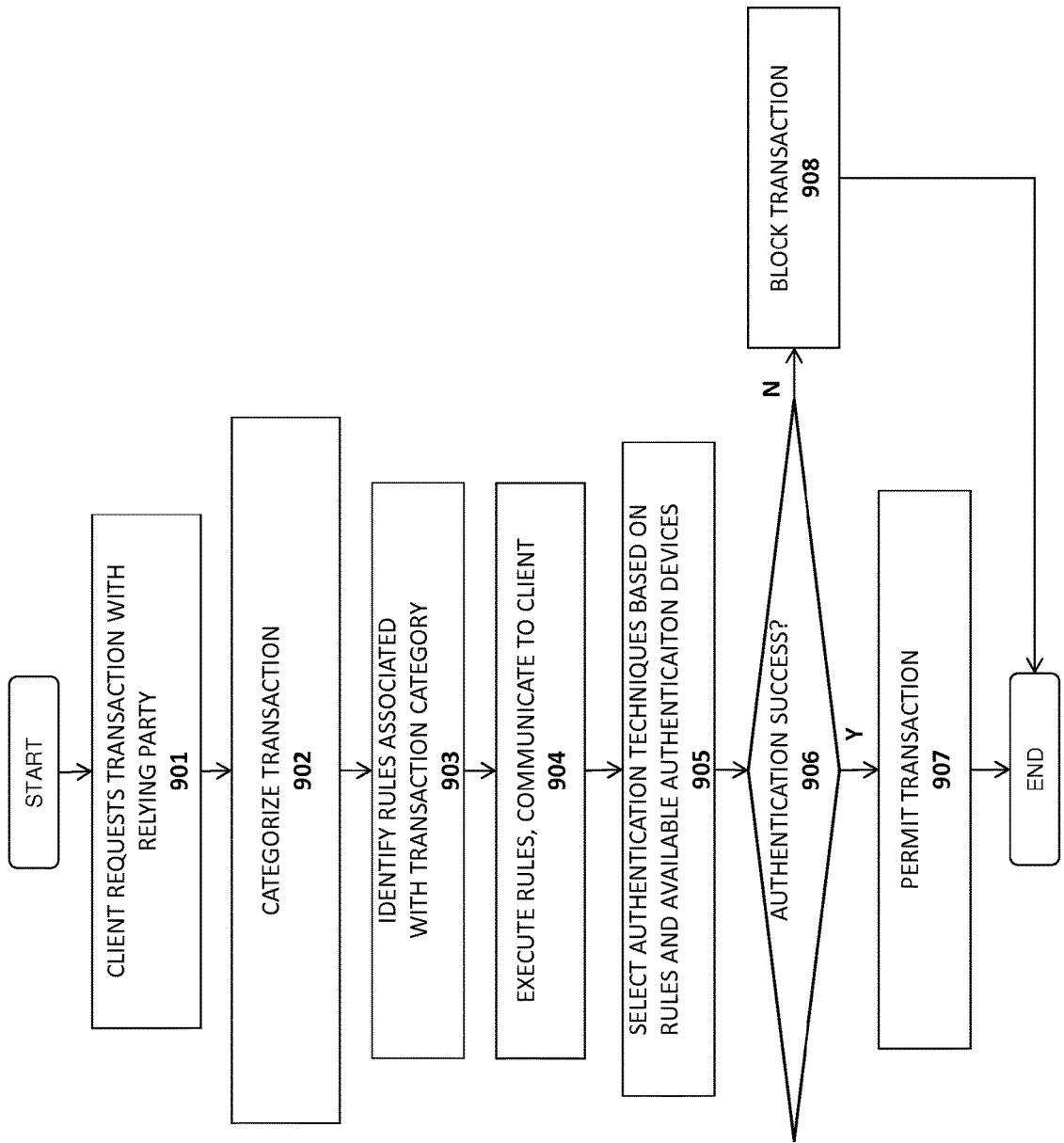
FIG. 9 illustrates one embodiment of a method for adaptively applying an authentication policy.

A method for performing adaptive authentication based on client device capabilities is illustrated in FIG. 9. The method may be implemented on the system illustrated in FIG. 8, but is not limited to any particular system architecture.

At 901 a client attempts to perform a transaction with a relying party. By way of example, and not limitation, the client may enter payment information for an online purchase or attempt to transfer funds between bank accounts. At 902, the transaction is categorized. For example, as discussed above, the transaction may be associated with a particular interaction class based on variables such as the amount of money involved or the sensitivity of information involved. At 903, one or more rules associated with the category of transaction are identified. Returning to the above example, if the transaction is categorized as a "high value transaction" then a rule associated with this transaction type may be selected. At 904, the rule(s) associated with the transaction type are executed and, as discussed above, information is sent to the client indicating the authentication requirements to complete the transaction. As discussed above, this may involve identifying specific authentication devices, identifying classes of authentication devices, or merely indicating the particular rule which needs to be implemented (e.g., if the client maintains local copies of the rules).

In any case, at 905 a set of one or more authentication techniques are selected based on the requirements specified via the rule(s) and the authentication capabilities of the client. If authentication is successful, determined at 906, then the transaction is permitted at 907. If not, then the transaction is blocked at 908 (or additional authentication is requested from the user).

There are numerous benefits realized from the embodiments of the invention described herein. For example, these embodiments reduce the effort required to integrate authentication capabilities at the relying party. For example, instead of writing code to codify an authentication policy, rules can be configured through a simple graphical user interface. All the relying party needs to do to integrate is define a policy for a class of interactions (for example: "Large Money Transfers") and have the integration code use that policy identifier when interacting with the policy engine to determine the correct authentication mechanism to leverage.

Moreover, these embodiments simplify authentication policy administration. By expressing the authentication policy outside of code, this approach allows the organization to easily update their authentication policies without requiring code changes. Changes to reflect new interpretations of regulatory mandates, or respond to attacks on existing authentication mechanisms become a simple change in the policy, and can be effected quickly.

Finally, these embodiments allow for future refinement of authentication techniques. As new authentication devices become available, an organization can evaluate its appropriateness to addressing new or emerging risks. Integrating a newly available authentication device only requires adding the authentication device to a policy; no new code has to be written to deploy the new capability immediately.

Exemplary System Architectures

It should be noted that the term "relying party" is used herein to refer, not merely to the entity with which a user transaction is attempted (e.g., a Website or online service performing user transactions), but also to the secure transaction servers implemented on behalf of that entity which may performed the underlying authentication techniques described herein. The secure transaction servers may be owned and/or under the control of the relying party or may be under the control of a third party offering secure transaction services to the relying party as part of a business arrangement. These distinctions are indicated in FIGS. 10A-B discussed below which show that the "relying party" may include Websites 1031 and other network services 1051 as well as the secure transaction servers 1032-1033 for performing the authentication techniques on behalf of the websites and network services.

Figure 10A:
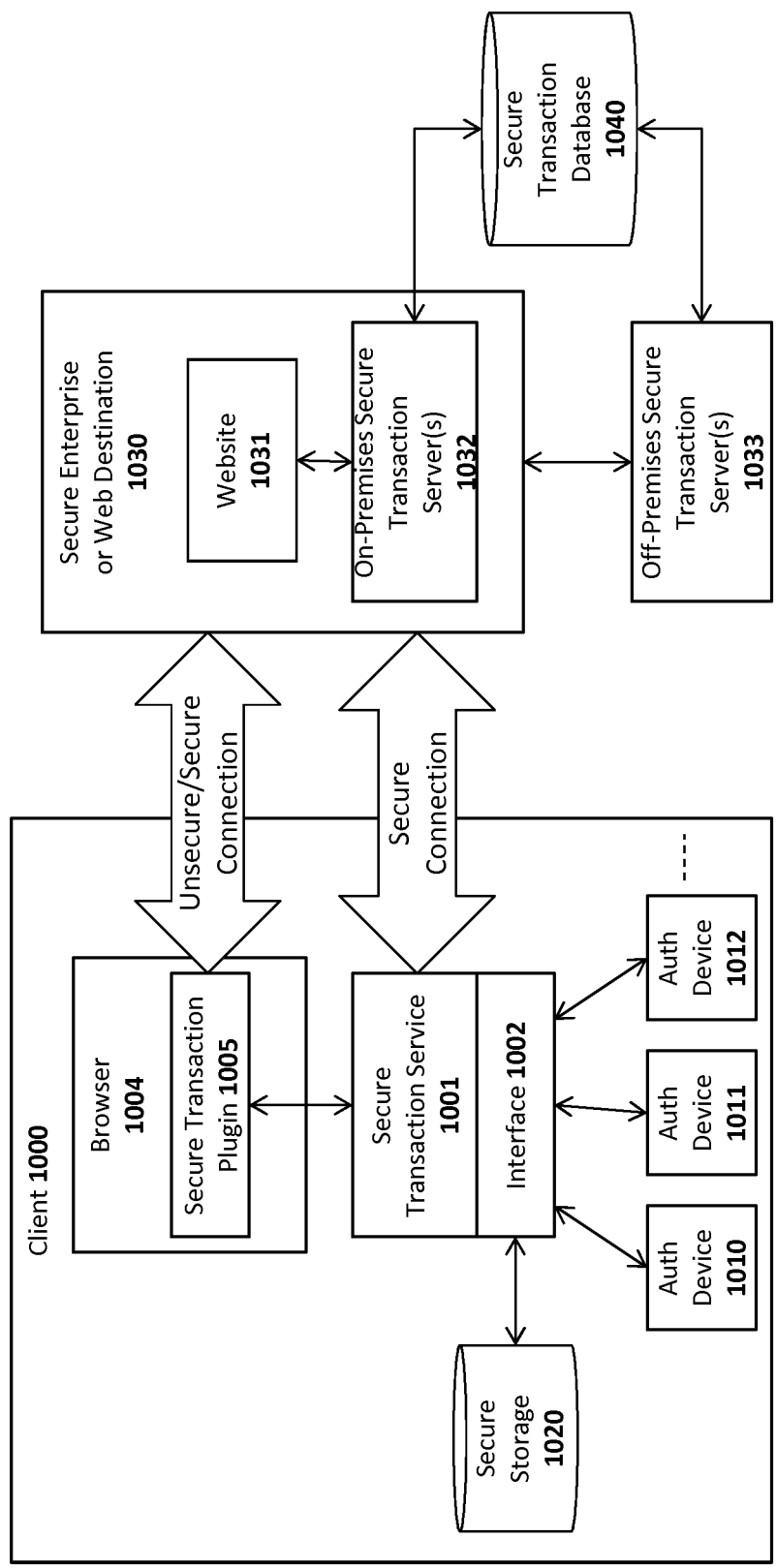
FIGS. 10A-B illustrate exemplary system architectures on which the embodiments of the invention may be implemented.
Figure 10B:
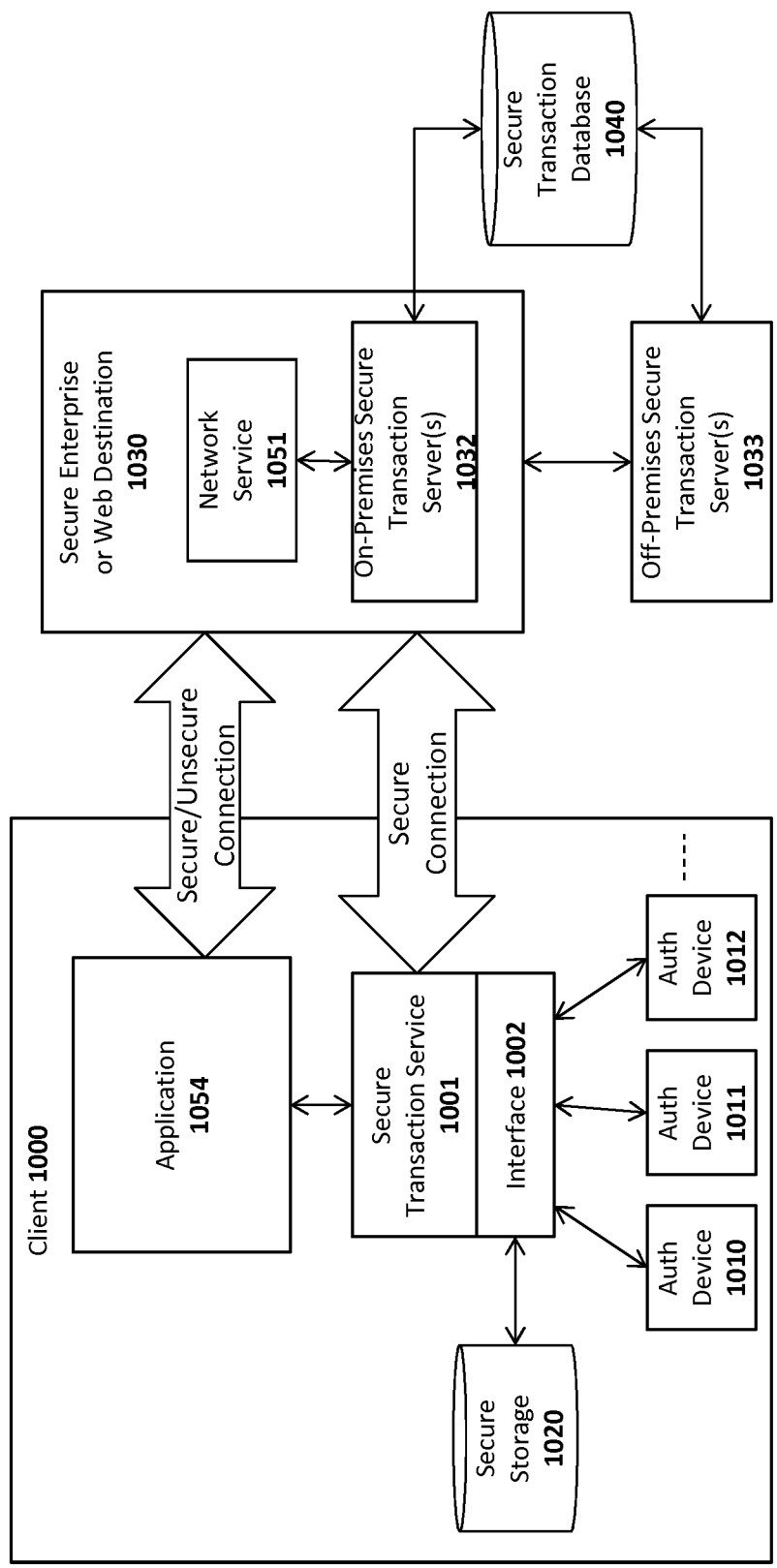

In particular, FIGS. 10A-B illustrate two embodiments of a system architecture comprising client-side and server-side components for authenticating a user. The embodiment shown in FIG. 10A uses a browser plugin-based architecture for communicating with a website while the embodiment shown in FIG. 10B does not require a browser. The various techniques described herein for adaptively implementing an authentication policy may be employed on either of these system architectures. For example, the authentication engine 811 at the relying party and local authentication engine 810 on the client in FIG. 8 may be implemented as part of the secure transaction service 1001 including interface 1002. It should be noted, however, that the embodiment illustrated in FIG. 8 stands on its own and may be implemented using logical arrangements of hardware and software other than those shown in FIGS. 10A-B.

Turning to FIG. 10A, the illustrated embodiment includes a client 1000 equipped with one or more authentication devices 1010-1012 for enrolling and authenticating an end user. As mentioned above, the authentication devices 1010-1012 may include biometric devices such as fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user) and non-biometric devices such as a trusted platform modules (TPMs) and smartcards. A user may enroll the biometric devices by providing biometric data (e.g., swiping a finger on the fingerprint device) which the secure transaction service 1001 may store as biometric template data in secure storage 1020 (via interface 1002).

While the secure storage 1020 is illustrated outside of the secure perimeter of the authentication device(s) 1010-1012, in one embodiment, each authentication device 1010-1012 may have its own integrated secure storage. Additionally, each authentication device 1010-1012 may cryptographically protect the biometric reference data records (e.g., wrapping them using a symmetric key to make the storage 1020 secure).

The authentication devices 1010-1012 are communicatively coupled to the client through an interface 1002 (e.g., an application programming interface or API) exposed by a secure transaction service 1001. The secure transaction service 1001 is a secure application for communicating with one or more secure transaction servers 1032-1033 over a network and for interfacing with a secure transaction plugin 1005 executed within the context of a web browser 1004. As illustrated, the Interface 1002 may also provide secure access to a secure storage device 1020 on the client 1000 which stores information related to each of the authentication devices 1010-1012 such as a device identification code, user identification code, user enrollment data (e.g., scanned fingerprint or other biometric data), and keys used to perform the secure authentication techniques described herein. For example, as discussed in detail below, a unique key may be stored into each of the authentication devices and used when communicating to servers 1030 over a network such as the Internet.

In addition to enrollment of devices, the secure transaction service 1001 may then register the biometric devices with the secure transaction servers 1032-1033 over the network and subsequently authenticate with those servers using data exchanged during the registration process (e.g., encryption keys provisioned into the biometric devices). The authentication process may include any of the authentication techniques described herein (e.g., generating an assurance level on the client 1000 based on explicit or non-intrusive authentication techniques and transmitting the results to the secure transaction servers 1032-1033).

As discussed below, certain types of network transactions are supported by the secure transaction plugin 1005 such as HTTP or HTTPS transactions with websites 1031 or other servers. In one embodiment, the secure transaction plugin is initiated in response to specific HTML tags inserted into the HTML code of a web page by the web server 1031 within the secure enterprise or Web destination 1030 (sometimes simply referred to below as "server 1030"). In response to detecting such a tag, the secure transaction plugin 1005 may forward transactions to the secure transaction service 1001 for processing. In addition, for certain types of transactions (e.g., such as secure key exchange) the secure transaction service 1001 may open a direct communication channel with the on-premises transaction server 1032 (i.e., co-located with the website) or with an off-premises transaction server 1033.

The secure transaction servers 1032-1033 are coupled to a secure transaction database 1040 for storing user data, authentication device data, keys and other secure information needed to support the secure authentication transactions described below. It should be noted, however, that the underlying principles of the invention do not require the separation of logical components within the secure enterprise or web destination 1030 shown in FIG. 10A. For example, the website 1031 and the secure transaction servers 1032-1033 may be implemented within a single physical server or separate physical servers. Moreover, the website 1031 and transaction servers 1032-1033 may be implemented within an integrated software module executed on one or more servers for performing the functions described below.

As mentioned above, the underlying principles of the invention are not limited to a browser-based architecture shown in FIG. 10A. FIG. 10B illustrates an alternate implementation in which a stand-alone application 1054 utilizes the functionality provided by the secure transaction service 1001 to authenticate a user over a network. In one embodiment, the application 1054 is designed to establish communication sessions with one or more network services 1051 which rely on the secure transaction servers 1032-1033 for performing the user/client authentication techniques described in detail below.

In either of the embodiments shown in FIGS. 10A-B, the secure transaction servers 1032-1033 may generate the keys which are then securely transmitted to the secure transaction service 1001 and stored into the authentication devices within the secure storage 1020. Additionally, the secure transaction servers 1032-1033 manage the secure transaction database 1040 on the server side.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a mobile computing environment, the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

I claim:

1. A method for user authentication comprising:
   initially defining a plurality of authentication device classes based on characteristics of client authentication devices, the characteristics comprising a type of authentication device and a level of security assurance of the client device's hardware and/or software;
   initially defining a plurality of interaction classes for a relying party, the interaction classes defined based on variables associated with interactions between a client and the relying party, the variables including an amount of money or a level of sensitivity of information involved in the interactions;
   initially defining one or more authentication rule sets specifying authentication devices or classes of authentication devices to be used for different interaction classes, the one or more authentication rule sets comprising a first rule set;
   detecting, by a secure transaction services engine, a user of a client attempting to perform a current interaction with a relying party over a network; and
   responsively identifying a first interaction class for the current interaction, by an adaptive authentication policy hardware engine, based on variables associated with the current interaction and
   implementing a first rule set of one or more authentication rules associated with the first interaction class to authenticate the user of the client, wherein implementing the first rule set of one or more authentication rules comprises the adaptive authentication policy hardware engine implementing a first rule specifying a particular authentication device class required to authenticate the user for the current interaction, wherein the first rule comprises a prioritized list of acceptable authentication device classes for the current interaction.

2. The method as in claim 1 further comprising:
   initially classifying a plurality of authentication device models into the plurality of authentication device classes based on characteristics of the authentication device models.

3. The method as in claim 1 wherein the client selects a first authentication device to be used for authentication based on the prioritized list of acceptable authentication device classes.

4. The method as in claim 1 wherein the variables associated with the current interaction comprises an amount of money or sensitivity of data involved in the current interaction.

5. The method as in claim 1 wherein the type of authentication device includes fingerprint authentication, PIN or password entry, face recognition authentication, voice recognition authentication, authentication using a trusted platform module (TPM) device, and/or retinal scanning authentication.

6. The method as in claim 2 wherein at least one authentication device class is defined to have a particular authentication factor with a false acceptance rate below a specified threshold.

7. The method as in claim 2 wherein at least one authentication device class is defined based on where and/or how a matching algorithm is implemented to match biometric data extracted from an authentication device with biometric template data stored in a secure storage.

8. The method as in claim 7 wherein the authentication device class is defined based on the matching algorithm being, or not being implemented within a secure execution environment.

9. The method as in claim 6 wherein the one authentication device class is further defined to store sensitive data in cryptographically secure hardware and/or software.

10. The method as in claim 3 further comprising:
    generating an assurance level based, at least in part, on a user authentication with the first authentication device.

11. The method as in claim 10 wherein the interaction is permitted if the assurance level is above a specified threshold.

12. The method as in claim 11 wherein the assurance level is generated, at least in part, based on current sensor data read from client sensors, wherein at least one of the sensors comprises a location sensor providing a current location of the client.

13. An authentication system comprising:
    an authentication policy database to store authentication policies for a relying party;
    a secure transaction services engine of the relying party to detect a user of a client attempting to perform a current interaction with the relying party over a network;
    an adaptive authentication policy hardware engine of the relying party to perform operations of:
       initially define a plurality of interaction classes in the authentication policy database, the interaction classes defined based on variables associated with interactions between the client and the relying party, the variables including an amount of money or a level of sensitivity of information involved in the interactions;
       initially define one or more authentication rule sets in the authentication policy database specifying authentication devices or classes of authentication devices to be used for different interaction classes, the one or more authentication rule sets comprising a first rule set; and
       query the authentication policy database to identify a first interaction class for the current interaction based on variables associated with the current interaction and to implement the first rule set of one or more authentication rules associated with the first interaction class to authenticate the user of the client, wherein implementing a first rule set of one or more authentication rules comprises the adaptive authentication policy hardware engine implementing a first rule specifying a particular authentication device class required to authenticate the user for the current interaction, the first rule comprising a prioritized list of acceptable authentication device classes for the current interaction, and wherein the adaptive authentication policy hardware engine is to perform additional operations of initially defining a plurality of authentication device classes in the authentication policy database based on characteristics of client authentication devices, the characteristics comprising a type of authentication device and a level of security assurance of the client device's hardware and/or software.

14. The authentication system as in claim 13 further comprising:

initially classifying a plurality of authentication device models into the plurality of authentication device classes in the authentication policy database based on characteristics of the authentication device models.

15. The authentication system as in claim 13 wherein the client selects a first authentication device to be used for authentication based on the prioritized list of acceptable authentication device classes.

16. The authentication system as in claim 13 wherein the variables associated with the current interaction comprises an amount of money or sensitivity of data involved in the current interaction.

17. The authentication system as in claim 13 wherein the type of authentication device includes fingerprint authentication, PIN or password entry, face recognition authentication, voice recognition authentication, authentication using a trusted platform module (TPM) device, and/or retinal scanning authentication.

18. The authentication system as in claim 14 wherein at least one authentication device class is defined to have a particular authentication factor with a false acceptance rate below a specified threshold.

19. The authentication system as in claim 14 wherein at least one authentication device class is defined based on where and/or how a matching algorithm is implemented to match biometric data extracted from an authentication device with biometric template data stored in a secure storage.

20. The authentication system as in claim 19 wherein the authentication device class is defined based on the matching algorithm being, or not being implemented within a secure execution environment.

21. The authentication system as in claim 18 wherein the one authentication device class is further defined to store sensitive data in cryptographically secure hardware and/or software.

22. The authentication system as in claim 15 further comprising:

the client generating an assurance level based, at least in part, on a user authentication with the first authentication device.

23. The authentication system as in claim 22 wherein the interaction is permitted if the assurance level is above a specified threshold.

24. The authentication system as in claim 23 wherein the assurance level is generated, at least in part, based on current sensor data read from client sensors, wherein at least one of the sensors comprises a location sensor providing a current location of the client.

25. The method as in claim 1, wherein the characteristics of client authentication devices further comprises a type of location in which secrets are stored.

26. The method as in claim 1, wherein the characteristics of client authentication devices further comprises a type of location where cryptographic operations are performed by the authentication devices.

27. The authentication system as in claim 13, wherein the characteristics of client authentication devices further comprises a type of location in which secrets are stored.

28. The authentication system as in claim 13, wherein the characteristics of client authentication devices further comprises a type of location where cryptographic operations are performed by the authentication devices.

* * * * *